April 1, 1969  E. W. DEWING ET AL  3,436,210
SUBHALIDE REFINING OF ALUMINUM
Filed Nov. 8, 1965  Sheet 1 of 5

INVENTORS
Ernest William Dewing
Norman W. F. Phillips
By Robert S. Dunham
Attorney

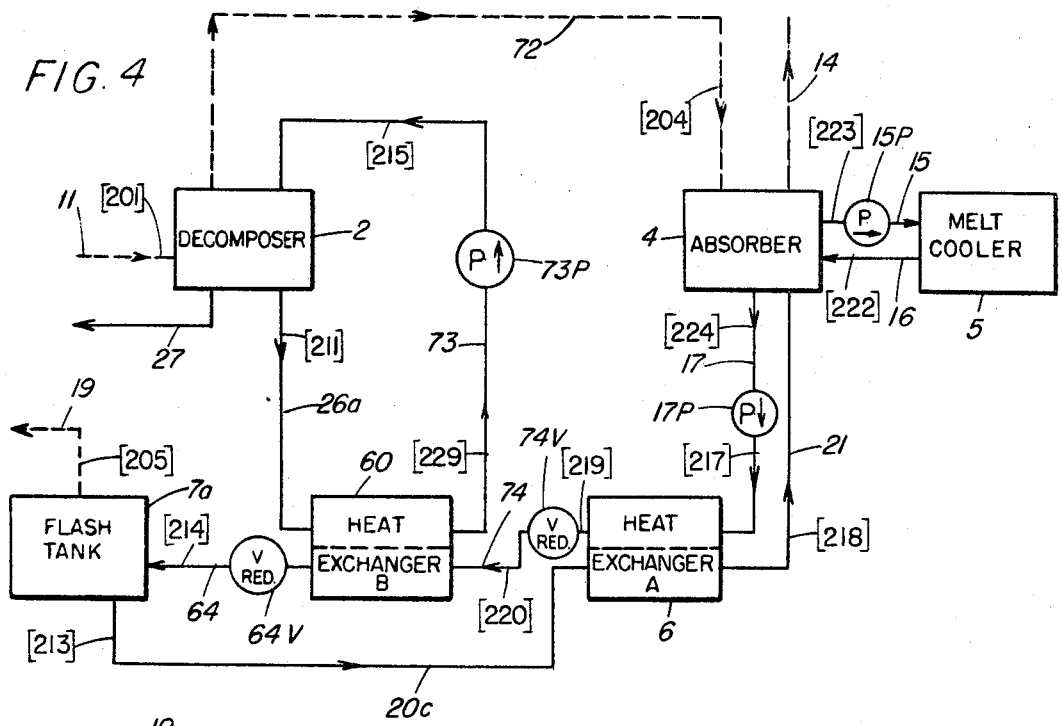
FIG. 4
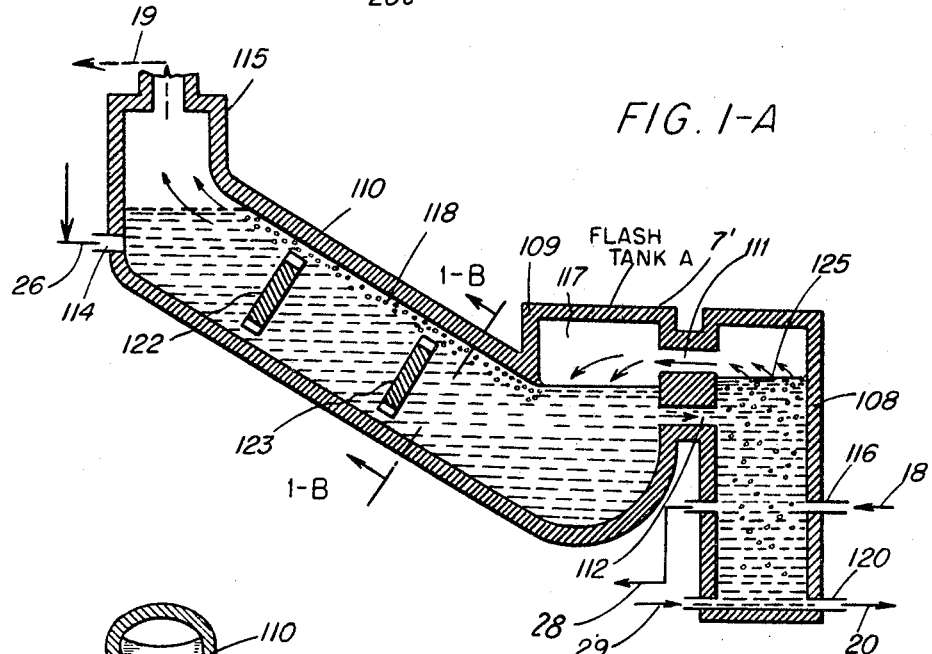
FIG. 1-A
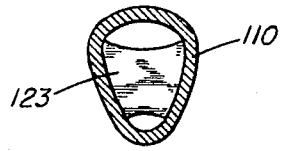
FIG. 1-B
INVENTORS
Ernest William Dewing
Norman W.F. Phillips
By Robert S. Dunham
Attorney

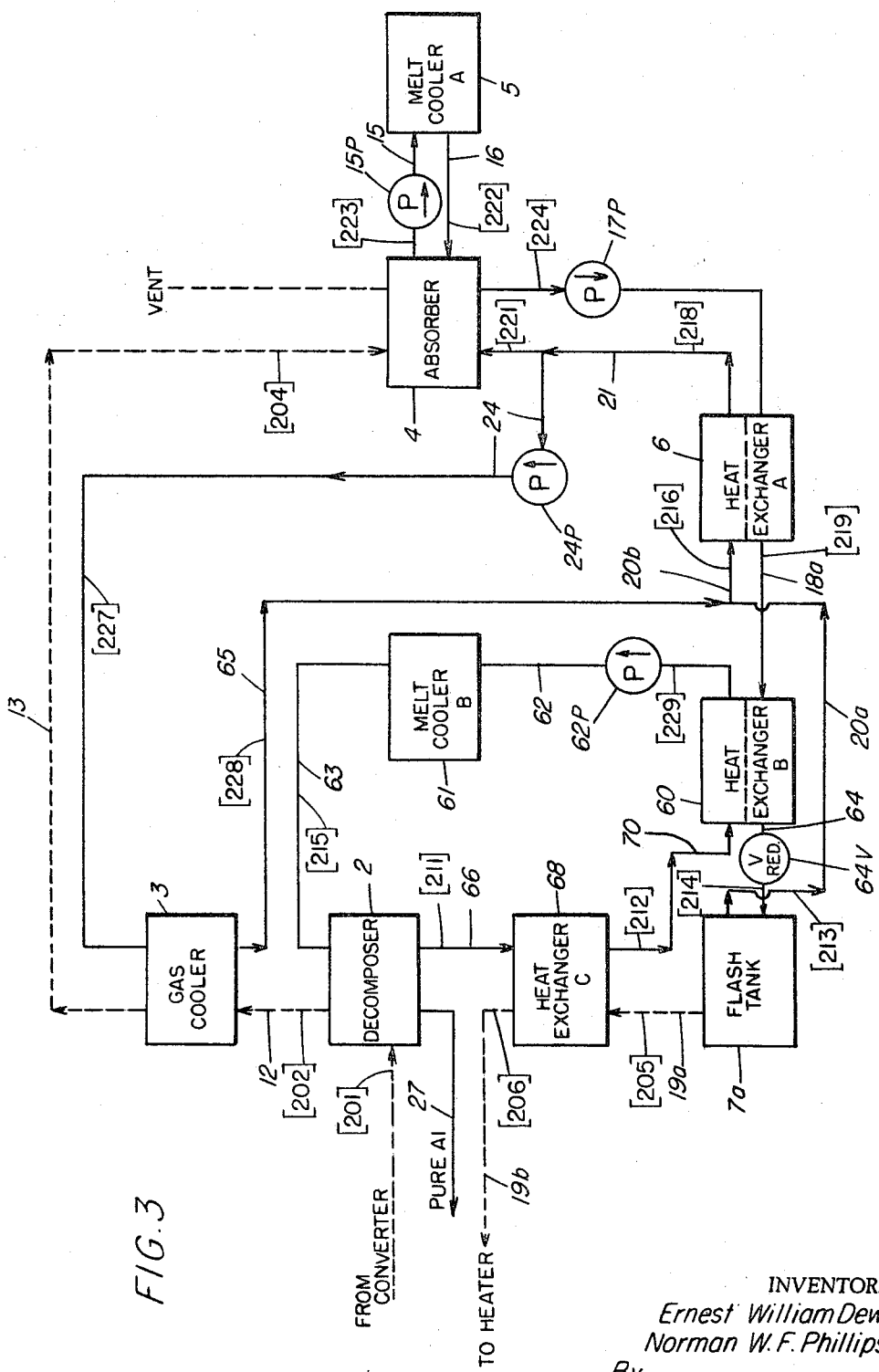

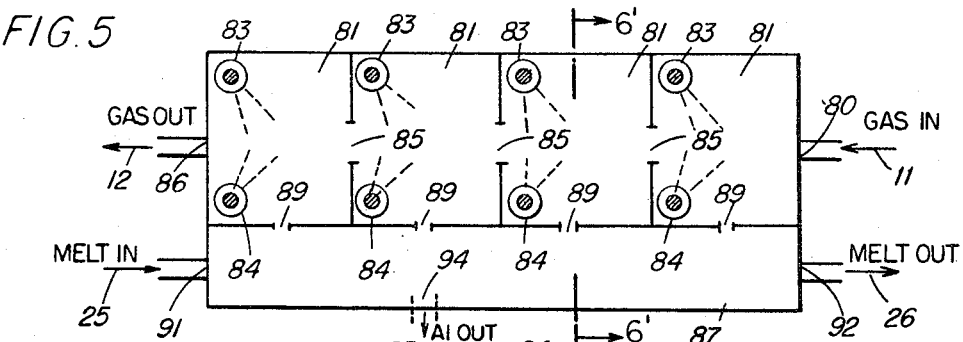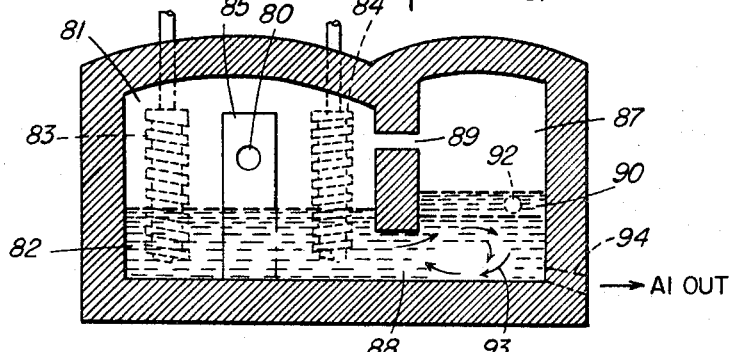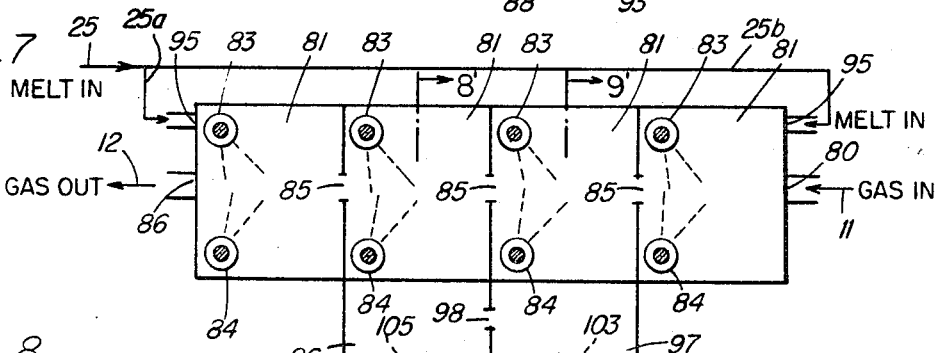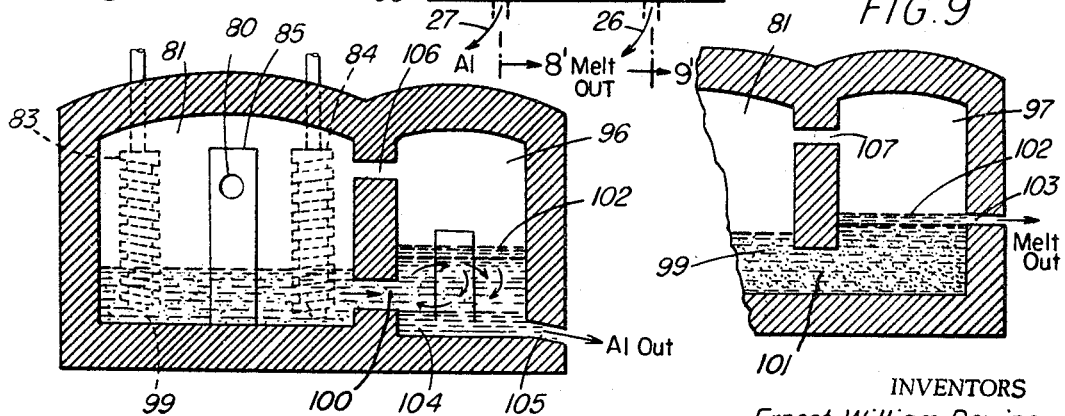

United States Patent Office 3,436,210
Patented Apr. 1, 1969

3,436,210
SUBHALIDE REFINING OF ALUMINUM
Ernest William Dewing and Norman W. F. Phillips, Arvida, Quebec, Canada, assignors to Aluminium Laboratories Limited, Montreal, Quebec, Canada, a corporation of Canada
Filed Nov. 8, 1965, Ser. No. 506,811
Int. Cl. C22b 21/06
U.S. Cl. 75—68                               26 Claims

ABSTRACT OF THE DISCLOSURE

In aluminum refining operation where impure aluminum is treated at high temperature in a converter with gaseous normal aluminum halide, e.g. trichloride, and the resulting gaseous aluminum monohalide, e.g. monochloride, is decomposed to yield pure aluminum and restored normal halide gas, procedure and apparatus here provide absorption of the restored halide in molten salt. From the enriched molten salt a restored flow of hot gaseous normal halide, at suitably higher pressure, for the converter, is evaporated with heat brought from the decomposer, e.g. by molten salt traversing the latter. Delivery of restored halide flow at high temperature is promoted by transfer of heat to the enriched salt from lean salt returning to the absorber, while further utilization of decomposer heat for such purpose is aided by circulating a part of the returned lean salt for heating by the halide gas out of the decomposer with direct or indirect transfer of such heat into the enriched salt. Further arrangements of salt melt flow and control may coact to afford high temperature of the re-established halide gas, including transfer of heat thereto from the hot melt traveling from the decomposer to the halide evaporation stage.

---

This invention relates to the subhalide refining of aluminum wherein impure aluminum-containing material is treated with normal aluminum halide gas, at high temperature, to convert aluminum to gaseous aluminum subhalide which is thereafter decomposed to yield purified aluminum metal and restored normal halide. More particularly, the invention is related to the circulation of normal aluminum halide back to the converting operation, with the primary aim of affording improved and unusually effective procedure and apparatus, functioning in cooperation or combination with the decomposition of gas from the converter, whereby the restored normal aluminum halide is satisfactorily returned for re-use in the converter, in gaseous state at an appropriate pressure and temperature consonant with economy and efficiency.

In practice of the subhalide process, utilizing normal aluminum halide such as aluminum trichloride or aluminum tribromide, the gaseous normal halide is conventionally advanced, in a highly preheated state, to and through the converter where under the influence of supplied heat, reaction occurs with the conveniently solid particles of aluminum-containing charge, to remove the aluminum as gaseous monohalide, e.g. aluminum monochloride or aluminum monobromide, which correspondingly leaves the converter as a stream of high temperature gas usually including a considerable quantity of unreacted normal halide. On traversal of this stream through the decomposer, the reverse, exothermic reaction occurs (by appropriate removal of heat), yielding highly purified aluminum metal, advantageously in molten form, and a discharge flow consisting of the normal halide gas, i.e. in total quantity generally equivalent to the stream entering the converter.

Various proposals have been made for recirculating the normal aluminum halide from the decomposer to the converter, for action thereon the continually renewed charge material, such proposals being generally of two types. On the one hand, it is apparent that mechanical means, as in the nature of pumps or blowers, can be employed for advancing the gas, or most of it, as such, along a suitable recirculation path. Such mechanical circulating means are a source of difficulty, in considerable part by reason of the relatively reactive nature of aluminum trichloride (or aluminum tribromide) and the desirability of effecting recirculation at a relatively high temperature for the sake of conserving heat energy. Thus the sealing of moving shafts in pumps or blowers is hard to achieve in the face of the corrosive, high temperature conditions, especially since the needs of practical operation for aluminum production by this process would ordinarily require circulator shaft speeds of the order of 10,000 r.p.m. Handling large gas flows with impellers driven at speeds of this order imposes unusually high stresses in the inpellers, with corresponding difficulty of design and maintenance. Finally, conditions may often be such that drops or particles of aluminum metal may be carried on with the gas and may separate in a blower or pump, to the extent of ultimately clogging such device.

While direct mechanical circulation of the gas, such as aluminum trichloride, is not impossible, it involves substantial difficulties in the above and other respects, which are enhanced by the desirability of maintaining the relatively high temperature, for example of the order of 700° C., at which the gas may leave the decomposer. Indeed even apart from economy of heat, the gas and all surfaces exposed to it, must be kept well above the point at which it condenses to a solid, for avoidance of clogging in that respect. With these problems in mind, effective proposals have been made for reducing the aluminum trihalide to a non-gaseous state, and then evaporating it for resupply to the converter, through a suitable gas heater. Certain particularly appropriate procedure and apparatus of this character are disclosed in the copending application of Ethan A. Hollingshead and Norman W. F. Phillips, Ser. No. 181,123, filed Mar. 20, 1962, for Procedure and Apparatus for Subhalide Refining of Aluminum, now Patent No. 3,235,376, granted Feb. 15, 1966. The procedure of the cited application involves absorbing or condensing part or all of the gas, e.g. aluminum trichloride, in a suitable molten salt mixture, for example consisting of aluminum trichloride and sodium chloride, and pumping said mixture to an evaporator, where gaseous aluminum trichloride is continuously evolved. Such reestablished trichloride gas is directed to the heater and converter, while the resulting lean salt mixture is recirculated to the absorber for continuation of the process. Permanent or non-condensable gases, such as hydrogen, methane or the like, which may tend to build up in the gas circulating through the converter and decomposer, are advantageously withdrawn in the absorber. While certain aspects of the invention embraced in the cited application Ser. No. 181,123 are preferably employed in the present invention, the latter is directed to improved, highly efficient operations and systems which afford special economy, notably in energy requirement, while achieving a very reliable and readily controlled mode of halide recirculation.

Although it has also been proposed heretofore to utilize heat from the decomposition of the monohalide as part, or indeed conceivably all, of the energy requirement for re-evaporating the normal halide from solid or liquid-absorbed state, a chief object of the present invention is to provide improved methods and apparatus that function, in cooperation with the decomposing step or steps, to achieve a suitable, reestablished halide gas flow with a maximum of convenience and unusual economy in utilization of heat. The present invention also specifically aims to avoid difficulties of heat transfer, as may occur with respect to evaporation of trichloride from massive solid state. The procedure and apparatus of the present improvements greatly facilitate, moreover, the reestablishment of the gaseous trichloride at suitable pressure, e.g., to accommodate necessary or desirable pressure drop in the converter and decomposer, the attainment of such pressure being preferably had while avoiding cumbersome equipment or structures that could be difficult to fabricate or to maintain in integral, sealed condition with respect to some fluids which might be selected for heat transfer.

As exemplified with the monochloride, the invention is directed to extremely efficient procedure and systems for utilizing the heat of decomposition of the aluminum monochloride for effectuating the re-evaporation of aluminum trichloride from a molten salt mixture into which the trichloride product of the decomposer has been absorbed, such operation being attained while delivering the re-evaporated trichloride at a suitably high pressure (e.g. substantially above that of the gas in the decomposer outlet), and especially at a desirably elevated temperature, e.g. upwards of 500° C. and most desirably of the order of 700° C. or above. In such operation, there is very substantial economy of heat, especially with respect to the function of the necessary gas heater in raising the delivered gas temperature to a value most appropriate for the converter (say 1200° C. or above); at the same time, the difficulties of mechanical circulating means are completely avoided, in that all mechanical advance is effected by pumping molten salt mixtures, which are much easier to handle from the standpoint of required equipment and its maintenance. Still further objects and advantages of the invention are explained or will be apparent in the description below.

To these and other ends, the improved procedure of the invention, as related to the subhalide refining process where a flow of gas containing aluminum monohalide, at high temperature, is delivered from a converter, involves subjecting such gas flow to the decomposing operation to yield purified aluminum metal and gaseous normal aluminum halide, and absorbing the last-mentioned halide gas in a body of molten salt, i.e. a molten salt mixture comprising the halide and one or more other suitable halides. The decomposing operation is effectuated by removing heat from the monohalide-containing gas, the improved procedure contemplating transfer of such heat to a suitable fluid, and a further feature of the invention in its specific aspects being the utilization of a molten salt mixture as constituting such fluid, indeed most advantageously a like mixture of the normal aluminum halide and other salt or salts. The melt, i.e. molten salt mixture, from the absorbing operation is circulated to and from a region where it comes into heat exchange relation with the heated fluid from the decomposing step, and by reason of heat transfer from the latter, the aluminum halide is effectively evaporated so that the melt return to the absorbing locality is depleted of the halide.

A special feature of the invention resides in effectuating certain further or second-stage operations of transfer of heat that is continuously contained, so to speak, in fluid or fluids discharging from the decomposing region. Thus specifically the return flow of melt from the evaporating stage is carried in heat exchange relation with the forward flow of halide-rich melt from the absorber, so that as the latter reaches the steps of primary heat transfer from the decomposer and of halide evaporation, it has been raised to a substantially higher temperature than on its departure from the absorber, such elevation in temperature being brought about, indirectly but none the less positively, by heat from the decomposing operation.

The process also includes, as a coacting feature in specifically novel and advantageous operations, the transfer of heat from the gaseous halide that is discharged by the decomposer, in such fashion as to recover this heat for use in the evaporating stage, i.e. as direct contribution to the temperature of the melt flowing to such stage or as compensating or preventing the occurrence of lower temperature in fluid or melt reaching such stage. In such fashion a maximum of heat is efficiently and conveniently recovered from the exothermic reaction of decomposition, not only for effectuating the desired re-evaporation of halide but in accomplishing the latter step to produce a halide gas flow at a desirably high temperature. That is to say, the heat transfer stages as above described, including particularly the effective operations of heat exchange with the forward melt flow from the absorber, result in a highly efficient circulation of the aluminum normal halide by reestablishing the same as high temperature gas, while conveniently delivering such gas at a suitable pressure (e.g. to accommodate necessary or desirable pressure drop in the converter and decomposer) and while affording a readily controlled and stabilized circulatory procedure of unusual relability.

In one further specific aspect, the invention is related to decomposing operations wherein the heat of such reaction is removed by flow of molten salt mixture, for example as more particularly described hereinbelow. In one advantageous species of the process, such melt flow is integrated with the circulating flow from and to the absorbing region, in that the highly heated melt from the decomposer is brought into contact and admixture with the enriched forward flow from the absorber, e.g. in a suitable flash tank, for direct evaporation or boiling of the halide. In this unusually advantageous mode of procedure, the salt mixture leaving the flash tank is divided into streams returning respectively to the decomposer and to the absorber. The critically significant further stage of heat transfer is conveniently effected between the second branch of such return flow and the forwardly moving enriched salt, which thereby reaches the flash tank at a desirably high temperature. At the same time, with appropriate flow division, a further stream of the halide-depleted melt can be withdrawn from the branch of return flow traveling to the absorber, e.g. after the second heat exchange step, and such withdrawn flow is then also directed to the decomposer while transferring further heat into it from the halide gas stream that is traveling from the decomposer to the absorber. By this last-described procedure, the further stage of heat transfer, as described above, is effectuated and the melt reaching the decomposer is maintained at a temperature for essentially highest efficiency in the ultimate conveyance of heat, in the melt stream leaving the decomposer, to the flash tank.

In another species of the process, the flow of melt through the decomposer may be effectively isolated from the melt circuit that includes the absorbing and flash stages. In such operation the separate decomposer melt flow is brought into heat exchange relation with the enriched melt from the absorber, conveniently just prior to the delivery of the latter into the flash tank, while the remaining heat transfer steps, including the heat exchange between the return and forward flows of absorber melt, and indeed also the step of supplemental melt heating by cooling of decomposer exit gas, are effected in relation to such circulatory system of the absorber. Further significant features of the procedure, including appropriate melt cooling stages and certain pressure controlling operations, as well as supplemental heat transfer steps, e.g. to obtain unusually high temperature in the reestablished gas, are described hereinbelow, all cooperating in the attainment of the desired result of efficient recirculation.

By way of example, illustration of certain advantageous embodiments of the apparatus and procedure of the invention is set forth in the accompanying drawings, wherein:

FIG. 1 is a schematic view, in simplified and largely diagrammatic form, of a monohalide refining system embodying the invention, with a number of elements shown as if in vertical section;

FIG. 1–A is a very simplified vertical section of a modified form of flash tank used as an element, e.g. in FIG. 1; FIG. 1–B being a section on line 1–B, 1–B of FIG. 1–A;

FIG. 3 is a diagram of a further system of the invention, shown as a modification of FIG. 2;

FIG. 4 is a like diagram of another, simplified system, as a further modification of FIG. 2;

FIG. 5 is a diagrammatic plan, as in horizontal section, of a modified decomposer, suitable for use in the systems of FIGS. 1 to 4;

FIG. 6 is a simplified structural view, as a vertical section on line 6'—6' of FIG. 5;

FIG. 7 is a diagrammatic plan, as in horizontal section, of a further modified decomposer, suitable for use in the systems of FIGS. 1 to 4;

FIG. 8 is a simplified structural view, as a vertical section on line 8'—8' of FIG. 7; and FIG. 9 is a fragmentary vertical sectional view, similar to FIG. 8, but taken on line 9'—9' of FIG. 7.

Figure 1:
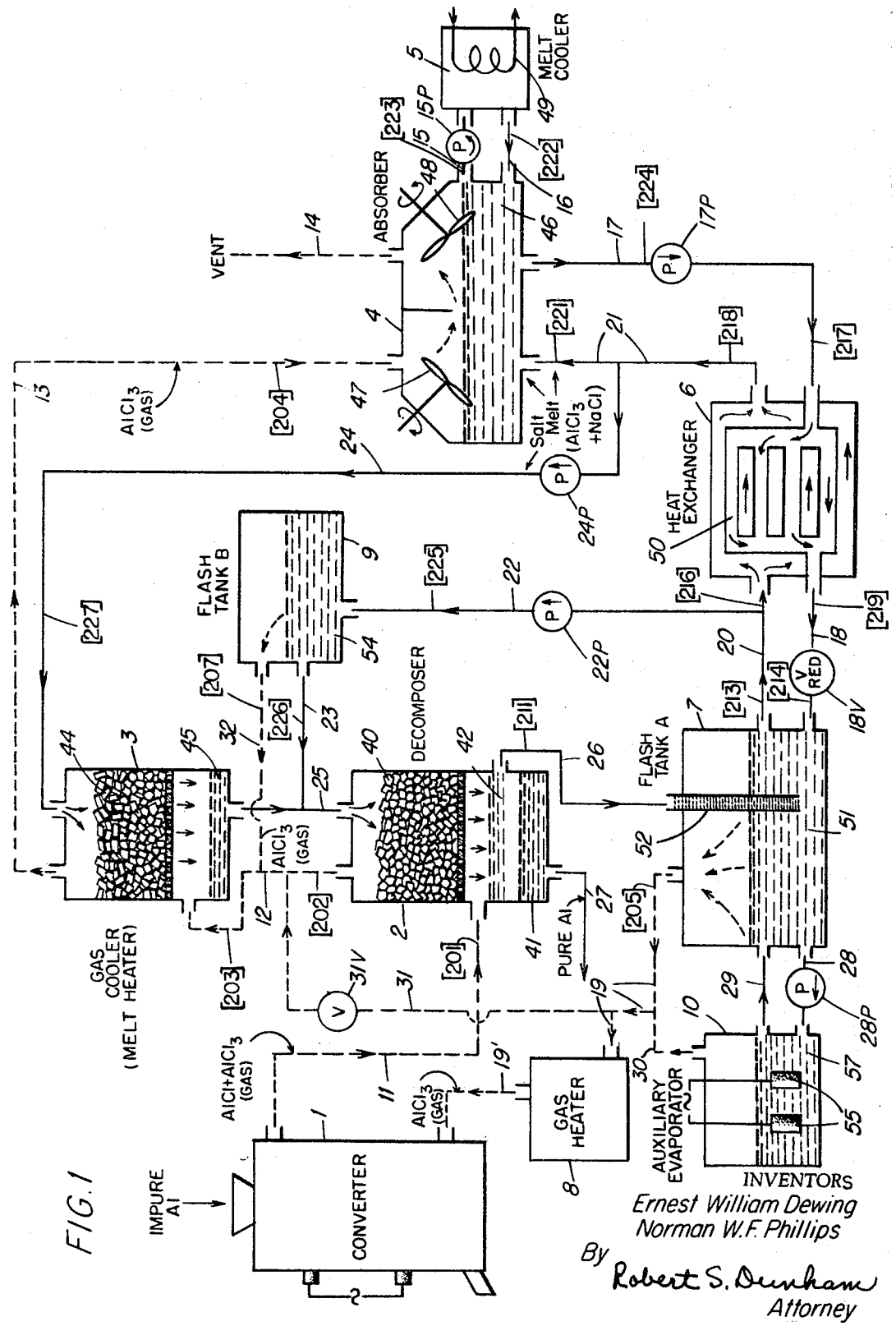

In the drawings, all of the elements of the apparatus are shown in highly simplified or diagrammatic form, and indeed in at least most instances are shown in an essentially symbolic manner, it being believed that appropriate structural details for actual operation will be readily known or understood and need not be given here. It will be understood that all elements of the systems are made of or lined with substances suitably resistant to the reactant gases, molten liquid or the like that are present, the materials of construction or lining also having appropriate thermal or other insulating properties where necessary; thus refractory materials are ordinarily contemplated for the interior of most vessels or chambers, although in general such are omitted from the drawings for simplicity.

Referring to FIG. 1, the subhalide refining system there shown includes a converter 1 which receives impure aluminum material, such as aluminum alloy from carbothermic reduction of bauxite or the like and which delivers a gas stream consisting essentially of aluminum monohalide and normal aluminum halide, e.g. a monochloride and trichloride respectively, to a decomposer 2. In the latter the monohalide is decomposed to yield metallic aluminum and a stream of normal aluminum halide gas, which then traverses a heat exchange device 3 functioning as a gas cooler (and also significantly as a melt heater, as explained below) and thereafter advances continuously to an absorber 4, where the aluminum halide content of the gas, for example aluminum trichloride, is absorbed in a salt melt, e.g. a molten salt mixture which may consist of aluminum trichloride and sodium chloride. Heat is removed from this molten salt mixture by circulation to and from an appropriate melt cooler 5.

From the absorber 4, the molten salt mixture, enriched by absorbed aluminum trichloride, is circulated through a heat exchanger 6 to a flash tank 7 (designated as flash tank A), where gaseous aluminum trichloride is evaporated or boiled from the melt, such gas then traversing a suitable heater 8 and returning to the converter 1, for use in the reaction there with aluminum of the charge material. The system also includes another, conveniently smaller flash boiler 9, designated as flash tank B, for receiving some molten salt from flash tank 7, and an auxiliary evaporator 10 which is separately heated and utilized in start-up of the operation.

As will be apparent, the monochloride-containing gas from the converter 1 travels through a duct 11 to a lower part of the decomposer 2, and from the top of the latter device the resulting trichloride gas stream traverses a duct 12 to a lower part of the gas cooler 3. From the upper end of the gas cooler 3 the trichloride, in gaseous state, continues through a duct 13 to one end of a path through the absorber 4, which also has provision, as by a duct 14 from the other end of such path, for venting non-condensable gases. It will be understood that certain permanent gases, such as hydrogen and methane, tend to arise in the system, especially by reason of conditions in the converter 1, and these are conveniently eliminated through the duct 14.

For simplicity of illustration, all gas-containing ducts or pipes in the drawings, i.e. as representing connections between elements of the system, are indicated by dashed lines, while similar connecting ducts or pipes that carry liquids are indicated by solid lines.

The circulation of melt, i.e. molten salt mixture, between the absorber 4 and the melt cooler 5, is handled by a duct 15 and a return duct 16, the duct 15 including a suitable pump 15P which advances the melt through the cooler and back through the line 16 to the absorber 4. Enriched melt from the absorber traverses the duct 17, being positively propelled by a pump 17P, through the heat exchanger 6 and then through a duct 18 to the flash tank 7. The line 18 also advantageously includes a pressure reducing valve 18V, which prevents flashing or boiling of the molten salt mixture in the heat exchanger 6 rather than in the tank 7. The restored or re-evaporated gas flow from the tank 7 moves through a duct 19 to the heater 8 and thence via a further duct 19' into the lower end of the converter 1.

Return flow of the melt from the flash tank is carried by a duct 20 leading to the heat exchanger 6, i.e. for traversal on the other side of the system of pipes or the like, which afford heat-transferring wall structure separating such return melt from the forward flow of lines 17 and 18 in the exchanger. From the latter device, the return flow continues via a duct 21 to the absorber 4. In accordance with the presently preferred procedure of the invention as embodied in FIG. 1, two lines of return flow of melt (molten salt mixture) also extend to the decomposer 2. One of these includes the duct 22 which carries a portion of the melt leaving the flash tank via duct 20, to the flash tank 9, from which the melt departs through a further duct 23. A second return flow of melt is withdrawn through a duct 24, from the flow in duct 21 that constitutes the return flow through the heat exchanger 6. The duct 24 leads to the gas cooler 3, e.g. at the top of the device, and from the bottom of the latter, the melt travels on to the decomposer 2 via a further duct 25. The melt from the return flow portion of melt from flash tank 9, through duct 23, also enters this duct 25 that supplies melt to the decomposer. Advance of molten salt mixture in the ducts or pipes 22, 24 is effected respectively by pumps 22P and 24P.

Flow of highly heated melt from the decomposer 2 travels to the main flash tank 7 through a duct 26, the arrangement being advantageously such that the melt reaches the flash tank at a pressure substantially elevated above that in the decomposer, i.e. to accommodate or to aid cooperatively, the maintenance of such pressure in this flash tank A. Although if desired a suitable pump (not shown) may be included in the pipe or duct 26, the required increase in pressure may be conveniently achieved, in many cases, by arranging the decomposer 2 at a suitable elevation above flash tank 7, thereby affording the required head of liquid.

Produced molten aluminum, in highly purified state, is withdrawn continuously or as desired from the bottom of the decomposer through a pipe or duct 27 which may lead to an appropriate, conventional casting plant (not shown), where it is cast into ingot or otherwise utilized.

Molten salt supply to the auxiliary evaporator 10 is conveniently taken from the flash tank 7, as by a duct 28, including a pump 28P, that is operated only when it is desired to use the evaporator 10, e.g. during start-up. Conveniently, for level equalization purposes, there may be a return duct line 29 from the evaporator 10 to the flash tank 7. Evolved aluminum trichloride gas leaves the evaporator 10 via a duct 30 which opens into the duct 19, to carry such gas to and through the heater 8, for supply to the converter 1. There is also a bypass line for gas leading from the duct 19, which ordinarily supplies the converter, to the duct 12, which is the gas discharge from the decomposer. This by-pass line consists of a duct 31 containing a valve 31V which is normally closed, for example being opened only when it is desired to shut down the operation.

Some gas, e.g. aluminum trichloride, is usually evolved in the flash tank 9, upon reduction in pressure of the salt melt as the latter enters this tank from the line 22. Such gas is conveniently delivered via a duct 32 to the gas path leading from the decomposer to the absorber, e.g. the duct 12 as shown.

The several elements of the system may be embodied in various forms, of which suitable examples are briefly mentioned. The converter 1 may be of known construction, functioning in the manner described above, to effectuate reaction of the supplied aluminum tri-chloride gas with a downwardly moving charge of granular aluminum-containing material, i.e. for converting the aluminum trichloride to aluminum monochloride and thereby transporting the aluminum in gaseous, subhalide form, the converter being appropriately heated as by electrical conduction through the charge. The gas heater 8 may likewise be of known type and is preferably included in order to deliver the incoming aluminum trichloride gas to the converter at a very high temperature, as of the order of the conversion temperature. The heater may conceivably be omitted if a lower temperature gas input to the converter is feasible, but in any event a special object of the invention is to deliver the re-evolved normal halide gas to the heater, through the line 19, at a relatively high temperature, and indeed in most cases preferably at about as high a temperature as possible in order to minimize energy requirements of the heater 8 in bringing the gas to the required converter inlet temperature. It will also be understood, of course, that other types of converter, e.g. as handling other kinds of aluminum-containing material, can be employed, the invention being readily applicable to such other conversion operations.

The decomposer 2 is generally arranged for effectuating the decomposition reaction by removal of heat into a suitable fluid, which is then further circulated, in accordance with the present process, to deliver such heat for the re-evaporation stage, as in flash tank A. Conveniently the decomposer establishes the deposited aluminum metal form, for ready collection and removal. Although a splashed metal decomposer, as of the type shown in U.S. Patent No. 2,914,398 (Johnston & Southam, issued Nov. 24, 1959), may be readily employed with heat removal liquid consisting of molten salt mixture, and indeed improved forms of splash-type decomposers, involving splashing of liquid aluminum or of combinations of aluminum and melt (such as illustrated in FIGS. 5 to 9 and described below) may also be used, the device 2 shown in FIG. 1 is advantageously exemplified as a so-called molten salt decomposer of the character embraced by the pending application of Phillips & Southam, Ser. No. 300,364, filed Aug. 6, 1963, for Decomposing Method and Apparatus for Subhalide Distillation now Patent No. 3,234,013, granted Feb. 8, 1966.

Thus the decomposer 2, as shown, comprises an upright vessel through which molten salt is circulated, as from the pipe 25 at the top and which receives the incoming flow of highly heated gas from the converter, containing aluminum monochloride and also unreacted aluminum trichloride, which may enter from the duct 11, to pass upwardly through the vessel. Among various arrangements for distributing the molten salt coolant over an extended area for contact with the received subhalide gas, as for instance devices for splashing the molten salt from a pool thereof, the structure in FIG. 1 shows conventional tower packing 40, through which the melt descends in extended surface contact with the gas rising through such packing, whereby the decomposition reaction occurs, by removal of the necessary heat, yielding molten aluminum which is carried down with the salt melt and accumulates as at a pool 41 in the bottom of the vessel (for withdrawal in the pipe 27), the molten salt also collecting in a separate pool or layer 42, e.g. above the metal 41, for withdrawal via the duct 26.

The gas cooler 3 serves primarily to transfer heat from the aluminum trichloride gas leaving the decomposer via the duct 12, as into a molten salt stream for utilization in connection with the re-evaporation of the trichloride. Although other heat exchange or transfer means may be employed, such as devices having heat exchange barriers between the fluids or arranged as conventional bubble cap or sieve plate columns, the device 3 in FIG. 1 is advantageously shown as a tower filled with conventional packing 44, being rings, saddles, or other elements, through which the gas flows upwardly in countercurrent relation to downwardly flowing melt from the pipe 24. In the example of FIG. 1 the melt thus raised in temperature by extended contact with the decomposer exit gas, is collected, as in a pool 45, to constitute part of the melt feed to the decomposer 2 through the pipe 25.

The absorber 4 serves to condense the aluminum trichloride gas (from the decomposer 2 and cooler 3) to non-gaseous state, by absorption in molten salt mixture at an appropriately lower temperature for promoting such absorption. While this device 4 may assume various forms, one suitable type is shown as being a horizontally elongated vessel partly filled with molten salt mixture 46 and having a baffle path for gas flow, wherein the melt is brought into extended surface contact with such gas by splashing devices, e.g. as indicated at 47, 48. It is found desirable to employ the cooler 5 for some heat removal from the absorber and consequent temperature maintenance therein, such cooler being of appropriate, conventional construction, as with coils for receiving the circulating melt (pipes 15 and 16) being cooled with water or other liquid, or alternatively, e.g. as diagrammatically indicated, with coils 49, receiving the circulation and coolant water or the like and arranged for exposure to the melt.

The heat exchanger 6 may likewise be a conventional type of such device, for instance embodying an array of tubes 50 through which one stream of molten salt (e.g. of lines 17 and 18) is led countercurrent to the other stream of molten salt (e.g. lines 20 and 21) flowing outside of the array of tubes. The flash tank A, indicated at 7, is any suitable device wherein evaporation or boiling of aluminum trichloride from the enriched melt may be effected by heat introduced with or into such melt, under the influence of some pressure drop in the melt entering the tank. Thus the operation is a flash-type evaporation, with the gas nevertheless evolved at an appropriate pressure, substantially higher than that of the gas leaving the decomposer (duct 12) and indeed very preferably higher than the gas leaving the converter (duct 11). Thus a simple form of flash tank 7 may consist of a metal tank with refractory lining (not shown) that may be about half filled with molten salt 51 and that has, in this instance, means 52 for introducing high temperature molten salt from the decomposer discharge pipe 26. On mixing this high temperature melt with the trichloride-rich melt coming from the absorber via the duct 18, a boiling condition ensues, evolving aluminum trichloride gas which discharges as a continuous, voluminous stream through the duct 19. The rich melt from pipe 18 is advantageously introduced through the bottom of the tank, since it is lighter than the depleted or lean melt withdrawn through pipe 20, mixing of the liquid contents of the tank being thereby promoted. The means 52 for introducing hot melt from the decomposer is advantageously a pipe leading below the surface of the melt 51 in order, as explained above, to create appropriate pressure head for the evolved gas, it being understood that alternative arrangements (not shown) are feasible as by having a suitable trap in the pipe line 26 or by utilizing a pump in such line for pressurizing flash tank A.

Flash tank B, indicated at 9, may be a vessel generally similar to flash tank 7, but ordinarily much smaller as less gas is there released. Since such evolution of gas as occurs in flash tank 9 is occasioned solely by release of pressure, this may simply be a vessel containing a body 54 of molten salt fed through the pipe 22 and discharging through the pipe 23, with the gas that is released above such body departing via the duct 32.

The auxiliary evaporator 10, employed in start-up of the process before sufficient heat of decomposition has become available to energize flash tank A, may have a relatively small capacity and may comprise a suitable arrangement for heating the enriched molten salt supplied from pipe 28. While this device 10 may thus be a conventional, direct-fired, tube-type boiler, it is shown as heated by electrical resistance heating with electrodes 55 in the molten salt pool 57, functioning similar to the evaporator shown in FIG. 1 of the above-identified application Ser. No. 181,123, now Patent No. 3,235,376.

The illustration of various elements of the system being essentially diagrammatic, it will be understood that the location of inlet and outlet ports and the arrangement of paths for liquid or gas in various devices is preferably such, in practice, as to achieve the stated results and avoid or minimize any undesired by-pass of unmodified fluid, as for example to avoid by-pass of lean melt in the absorber 4, or of uncondensed trichloride gas there, or of rich melt in the flash tank 7. The flash tanks, moreover, are appropriately designed to have sufficient surface area of the liquid so that gas is released in desired quantity without carrying appreciable liquid with it.

In essential features, the process of the invention as illustrated in FIG. 1 involves advancing the monochloride-containing gas through the decomposer, where the exothermic reaction is performed, delivering heat to the molten salt that has entered through the line 25. The product aluminum is withdrawn through pipe 27, while the gas stream, consisting now essentially of aluminum trichloride, is carried forward, eventually to reach the absorber 4, where it is condensed by absorption in the molten salt mixture 46 there. From the absorbing operation, molten salt correspondingly enriched in aluminum trichloride is advanced to the flash tank 7, where it mixes with the highly heated molten salt drawn from the decomposer through line 26. By reason of the corresponding large increase of temperature, in effect relative to the pressure, aluminum trichloride gas is boiled from the rich salt, to serve as the continuing supply for the converter, via the gas heater 8. The flashing operation is aided by the supply of rich salt under pressure through the line 17, heat exchanger 6 and line 18, utilizing the pump 17P; some reduction in pressure occurs at the valve 18V, in such aid of the flashing step, but at the same time by virtue of the pressure remaining in the liquid at the inlet of flash tank 7 and the head of hot melt delivered through the pipes 26 and 52, the trichloride gas is evolved at a pressure sufficiently above that in the duct 12, and of course above that in the duct 13, as to accommodate necessary and desirable pressure drop in the gas heater 8, converter 1 and decomposer 2, especially the last two devices. It will be understood that effective operation of the converting and decomposing steps, including desired reactive contact with the charge in the converter and desired heat transfer for the respective endothermic and exothermic reactions in these stages, requires significant pressure drop in the gas stream traversing each. The illustrated procedure has the notable advantage of reestablishing the trichloride gas flow with sufficient pressure to overcome such drops and thus effectuate flow of the gas through both stages in desired volume, without requiring mechanical advancing means.

Not only is the process useful in its basic aspects and particularly advantageous in the illustrated embodiment involving a decomposing step wherein molten salt mixture is employed for removing heat and is thereafter conveyed to a region of higher pressure, e.g. flash tank A, for effectuating re-evaporation of trichloride, but the invention embraces significant, coacting operations that impart an unusually high order of efficiency. It may be noted that in practical utilization of the subhalide process over any of a range of operating conditions (as for example where the converter exit gas is delivered at 1200° C. to 1250° C. or more, with about 25% conversion of the normal halide input), the heat of decomposition of the monohalide is usually of an amount equal to or greater than the heat required to evaporate the aluminum halide gas leaving the decomposer, indeed such amount being sufficient for that purpose even where the evaporation must occur from molten salt and also involves raising the temperature of the non-evaporating portion of such salt. The present invention embraces specific features which have been discovered as affording unusual efficiency and special advantage in the utlization of the decomposition heat for circulating the halide gas by re-evaporation and especially in delivering such gas at a relatively high temperature, with a consequent minimum of heat energy requirement (as in the heater 8) for the ultimate temperature needed for the gas supply to the converting step. Specially important in these respects is the stage of transferring heat between the return melt flow from flash tank A and the forward flow of enriched melt advancing to the flash tank. This further stage of recovery of heat from the decomposing operation, e.g. as effected in the heat exchanger 6, results in delivery of enriched salt to the evaporating step at a higher temperature, and specifically, affords production of gaseous aluminum trichloride at a very materially higher temperature than is possible by the direct transfer alone, of the heat in the decomposer salt flow to the enriched melt for the flash tank. This coacting heat transfer step, i.e. in the heat exchanger 6, is materially aided by maintaining a relatively high pressure in the rich salt flow, as by the coaction of the pump 17P and the pressure control afforded by valve 18V. Indeed as explained, the reducing valve 18V prevents unwanted evaporation and bubbles of trichloride gas in the passages of the heat exchanger as might be occasioned by release or lowering pressure therein while the temperature of the rich melt is rising.

A further significant aspect of the complete process resides in the heat transfer stage performed in the gas cooler 3, whereby at least a part of the return melt to the decomposer, being preferably melt which has been reduced in temperature by the stage of heat exchanger 6, is greatly raised in temperature by heat from the decomposer exit gas. Not only does this operation facilitate the absorbing step (in reducing its requirements for energy removal) but it provides a correspondingly higher temperature of the incoming coolant melt to the decomposer. It has been discovered that efficient operation of the latter stage can accommodate such higher temperature of the heat removing melt, with the effect, highly significant in the present process, of raising the temperature of the hot melt flowing to flash tank A, as through the pipe 26. Thus by virtue of the coacting operations in heat exchanger 6 and gas cooler 44, very significantly larger amounts of heat are conveyed to the evaporating step (e.g. in flash tank A), with the result of production there of aluminum trichloride gas at unusually high temperatures, for example, upwards of 600° C. and preferably 700° C. or above. The improvement in temperature of the reestablished trichloride gas flow afforded by these coacting heat transfer steps is often of the order of several hundred degrees C., at least a major proportion of this temperature increase being usually attributable to the direct heat recirculation through the heat exchanger 6, a step which accomplishes such heat recovery in a full measure and without losing heat to other operations such as that of gas absorption and accompanying melt cooling.

The significance of the supplemental heat transfer operation, i.e. re-circulation, in effect, of heat to the evaporating stage, as occurring in the heat exchanger 6 and gas cooler 3, is emphasized in the fact that in presently preferred examples of satisfactory operation, a substantial proportion of the return flow of melt to the decomposer is effected directly. That is to say, of the melt leaving the flash tank A via duct 20, a considerable part, indeed in many cases half or more, is pumped directly to the decomposer melt inlet via pipe 22 (in FIG. 1), with only the remaining part traversing the heat exchanger 6. Similarly the melt returning to the decomposer via the duct 20 and the gas cooler 3 is usually only a minor portion of the total melt entering the decomposer in the duct 25. Hence although much of the residual heat content of the melt leaving flash tank A is in effect carried directly back to the decomposer by simple melt re-circulation, unusually significant advantage is attained by special, further heat recovery in the steps of the gas cooler 3 and heat exchanger 6, which thus materially contribute to the high temperature of gas evolved in flash tank A, well beyond what might be achieved by merely re-circulating the decomposer coolant melt.

The operation in flash tank B (although conceivably unnecessary in some cases) is of coacting utility in reventing flashing or boiling of the melt in the decomposer, which might otherwise happen when this heated return melt undergoes a fall in pressure (from that of the flash tank A) to the lower pressure of the decomposer. This supplemental flash tank 9 is thus a safeguard in permitting withdrawal of such quantity of gas, however slight, as is evolved because of the necessity of dropping the pressure of the melt to the lower pressure that occurs in the decomposer; while there is a little loss of efficiency in that this gas is simply added to the load of the absorber, it is often highly important to avoid flashing in the decomposer and corresponding interference with proper gas-liquid contact there.

The general operation of the process, as shown in FIG. 1, should now be understood from the foregoing description and explanation, specific examples of a number of sets of working conditions being given hereinbelow. In practice, start-up and control of the improved trichloride re-circulation system is quite readily effected. For instance, at the beginning, the flash tanks 7 and 9, heat exchanger 6, absorber 4, melt cooler 5, auxiliary evaporator 10, and connecting piping are filled (to the desired levels in the several vessels) with molten salt, e.g. a mixture of aluminum trichloride and sodium chloride in a proportion intermediate between the values ultimately established, at equilibrium, in the absorber and flash tank A respectively. With the converter 1 and heater 8 suitably pre-heated and with the converter then charged and brought up to operating temperature, the auxiliary evaporator 10 is started, to initiate flow of aluminum trichloride gas through the heater 8 and the converter 1. The various pumps 15P, 17P, 22P, 24P and 28P are put in operation and appropriately adjusted initially or as needed to achieve the functioning of the system in the manner described above. When the desired maximum flow rate of aluminum trichloride, from flash tank A through the duct 19, has been attained, the heat input to the auxiliary evaporator 10 can be discontinued and the pump 28P turned off.

Reference being made to the examples below for instances of suitable temperature and other conditions, it will be understood that the several pumps and other equipment are controlled or adjusted to achieve the selected conditions. For instance it may be assumed that the converter is delivering gas to the decomposer at a temperature of 1200° C. to 1250° C., containing 50 mol percent AlCl and 50 mol percent $AlCl_3$, and it is desired to produce re-evaporated aluminum trichloride gas in flash tank A at a temperature in the range of 600° C. to 700° C.; the pump 15P is operated so that the melt cooler 5 effectively removes the heat released by absorption of trichloride gas in the absorber 4, and maintains the melt in the latter device at a desired temperature, say about 200° C. The pump 17P is operated to maintain a desired substantial level of melt in the absorber, i.e. so that the amount of enriched salt removed per unit of time is equal to the amount of lean salt returned via the duct 21 plus the amount of trichloride gas absorbed in the absorber 4, likewise per unit of time. The pump also delivers the melt flow to the heat exchanger at appropriate pressure, for instance several atmospheres where the gas entering the decomposer 2 through line 11 is at about one atmosphere and the pressure in the gas system beyond the decomposer and including the absorber may be a fraction of an atmosphere. During the initial period in which it is operated, the pump 28P will function at the same rate as pump 17P. The reducing valve 18V is adjusted to prevent any appreciable evaporation of aluminum trichloride from the enriched molten salt traversing the heat exchanger 6 from pipe 17, while at the same time maintaining a suitable elevated pressure in the flash tank 7, for instance 1.5 atmospheres under the circumstances noted above.

Pumps 22P and 24P, or more generally, the rates of flow of melt in the ducts 22 and 24 respectively, are controlled or set to achieve desired temperature relationships of the melt entering and leaving the decomposer and of the melt in the flash tank A, as well as the temperature differential in the heat exchanger 6, to the end of effecting the desired evaporation, in flash tank A. Such evaporation, for example, is of aluminum trichloride at the desired temperature mentioned above, and in amount equal to that represented by the gas product from the converter 1 after decomposition has restored such product to consist essentially solely of aluminum trichloride. As explained above, a function of the heat exchange operation in the device 6 is to effect substantial rise in the temperature of the rich melt traveling to flash tank A, by reason of some of the heat which remains in the return melt (originally derived from the decomposer) that has been unused, in effect, in the flash tank A, especially in that the flash tank generates gas at the desired temperature and thus discharges melt at substantially such temperature. Pump 22P basically governs the return flow of melt to the decomposer, being adjusted in cooperation with the setting of pump 24P and such pumps together being set to withdraw all melt in quantity above that desired for return to the absorber. As also stated above, a function of the gas cooler 3, and the flow of melt thereto through pipe 24, is to raise the temperature of melt returning to the decomposer 2, by reason of heat removed from the decomposer exit gas. Assuming that the gas cooler 3 and decomposer 2 are generously designed, i.e. so that there is good or maximum heat transfer to the respective melt streams, the pump 22P is basically operated to maintain the hot melt discharge from the decomposer, in pipe 26, at a desired temperature, say 750° C. to 850° C., the setting of pump 24P being effected to cooperate in attaining this result. For instance, if it is found that flash tank A is running cold, a suitable re-adjustment is to increase the flow through the pump 24P. This change alone will increase the melt flow entering the decomposer in the duct 25, but may be assumed not to alter the temperature of such melt flow appreciably. A result, however, of the increased flow through the decomposer 2, will be to reduce the temperature of the hot melt supplied through the pipe 26, and in consequence the pump 22 should be cut back until the melt flow in 26 is brought down to what it had been previously. Thus the increase in flow in line 24 is exactly compensated by a decrease in flow in line 22. The result of these changes is an increase in the proportion of lean melt from the flash tank 7 (line 20) which traverses heat exchanger 6 so that in consequence the hot melt stream in duct 18 becomes hotter, and the desired increase in temperature in flash tank 7 is thereby achieved.

In general, it will be seen that although there is some slight cooling of the melt traversing flash tank B, the streams in ducts 22 and 23, and the total stream entering the decomposer 2 through duct 25, may be assumed to be fairly closely at the same temperature, for example a temperature selected in the range of 600° C. to 650° C. or even approaching 700° C., the same temperature (or a little less) being generally characteristic of the gas entering and melt leaving the gas cooler 3. As indicated above, the flow in the duct 24 to the gas cooler (melt heater) 3 can provide a convenient mode of controlling the temperature in flash tank A, the pump 24P being thus in effect operated in coaction with adjustment or setting of other flows to maintain the desired, preferably high temperature of gas evolution in this flash tank.

Various modifications can be made in the system and operations of the invention, as in the construction or type of equipment or in arrangements to promote high temperature of the re-evaporated trichloride gas. Although one mode of further insuring such high temperature is to embody the heat exchanger 6 in two units with the decomposer melt return duct 22 withdrawing lean salt from a locality between them, an especially effective modification is to employ a countercurrent arrangement, between hot melt from the decomposer and evolved trichloride gas, in the flash tank A. Such arrangement is shown in FIG. 1-A, and has a special advantage in enabling the gas stream to exit at a temperature materially higher, e.g. by 50°-75° C., than that obtained in a straight mixing type of flash tank, and similarly higher than the temperature of the lean melt leaving the tank via the duct 20. Overall additional heat recovery is thus achieved, for example of about 0.1 kw./hr./lb. of aluminum.

The countercurrent tank 7' in FIGS 1-A and 1-B comprises a vertical cylindrical tank 108 in series with a U-tube having an upright leg 109 and a further sloping leg 110, the upright leg 109 communicating with the tank 108 through vertically spaced passages 111 and 112 for gas and melt respectively. Hot, relatively lean melt from the decomposer in pipe 26 (see FIG. 1, wherein the present tank 7' may be substituted for tank 7) enters at an upper region of the leg 110, e.g. at the inlet 114, which may be below the adjacent level of the melt unless a trap is provided in the line 26, and highly heated aluminum trichloride gas is discharged through an outlet 115 at the upper end of the leg 110, i.e. into the pipe 19. The hot melt from the decomposer thus fills and flows down the leg 110 and occupies the other leg 109, as shown, so as to traverse the passage 112 into the cylindrical tank 108, where it mixes with the rich melt from the heat exchanger 6, supplied through pipe 18 at an inlet 116 located below the middle of the tank 108. Boiling or flashing thus occurs in the tank 108, so that alumi-num trichloride gas bubbles up through the melt and traverses the passage 111 into the upper portion 117 of the U-tube leg 109. As a relatively high pressure may thus be established in the region 117, the gas then bubbles along the sloping leg 110, as shown at 118, thus traveling countercurrent to the high temperature melt and recovering heat from it so as to discharge through the outlet 115 at essentially maximum temperature. Mixed, lean melt is withdrawn at the bottom of the tank section 108, through outlet 120, for passage in the pipe 20, as in FIG. 1.

The entire structure, which may have a suitable steel shell (not shown), is lined with insulating refractory material, and suitable refractory baffles 122, 123, are placed in the U-tube as shown to limit mixing of the liquid and to maintain the countercurrent flow, the U-tube being conveniently ovate in section (FIG. 1-B).

By way of example, suitable dimensions for a unit handling 20,000 lbs./hr. of $AlCl_3$ gas, include an inside diameter of 5.5 feet and height of 17.5 feet for the tank 108, with the rich melt inlet 116 located about 6 feet from the bottom and the liquid level 125 maintained about 12 feet above the bottom. The U-tube is about 30 feet long, i.e. along its leg 110 which has its axis at about 30° from the horizontal. The maximum height and width of the U-tube, e.g. the leg portion 110, are about 7 feet and 4 feet respectively.

As will also be understood, various elements and operations of the illustrated systems can be omitted or modified to the extent that special circumstances or other or lesser requirements may permit. Thus conceivably, absorption of trichloride of the gas flow in the melt can be achieved by condensation to solid and feeding the solid particles to the melt. As an instance of permissible omission of an element, the flash tank B, shown at 9 (FIG. 1), can be dispensed with if flashing of melt in the decomposer is found to be inconsequential or can be tolerated, as by reason of the nature of the decomposer design.

Likewise, for example, the systems may sometimes be operated without the gas cooler 3, or without its function, one such modified arrangement being shown in FIG. 4 and described below. In general, in some cases where the evolved trichloride gas flow, as through duct 19, is not required to be at the highest possible temperature, the heat transfer operation in the gas cooler 3 can be dispensed with. It may similarly be omitted in certain situations where conversion of aluminum trihalide to aluminum monohalide in the converter 1 is particularly high, being usually marked by a higher temperature of the converter exit gas and affording a larger proportion of monohalide which yields heat by the decomposing reaction. While it is conceived that in some instances the evaporating or flashing operation may be achieved with equipment built directly (with suitable isolation of gases) into the decomposer, the system of FIG. 1 preferably involves some arrangement whereby with appropriate relative location of the decomposing chamber and the flash tank, or equivalent pumping, there is convenient attainment of an increase of pressure in the hot melt as brought to the rich salt mixture to cause evolution of trihalide gas.

Figure 2:
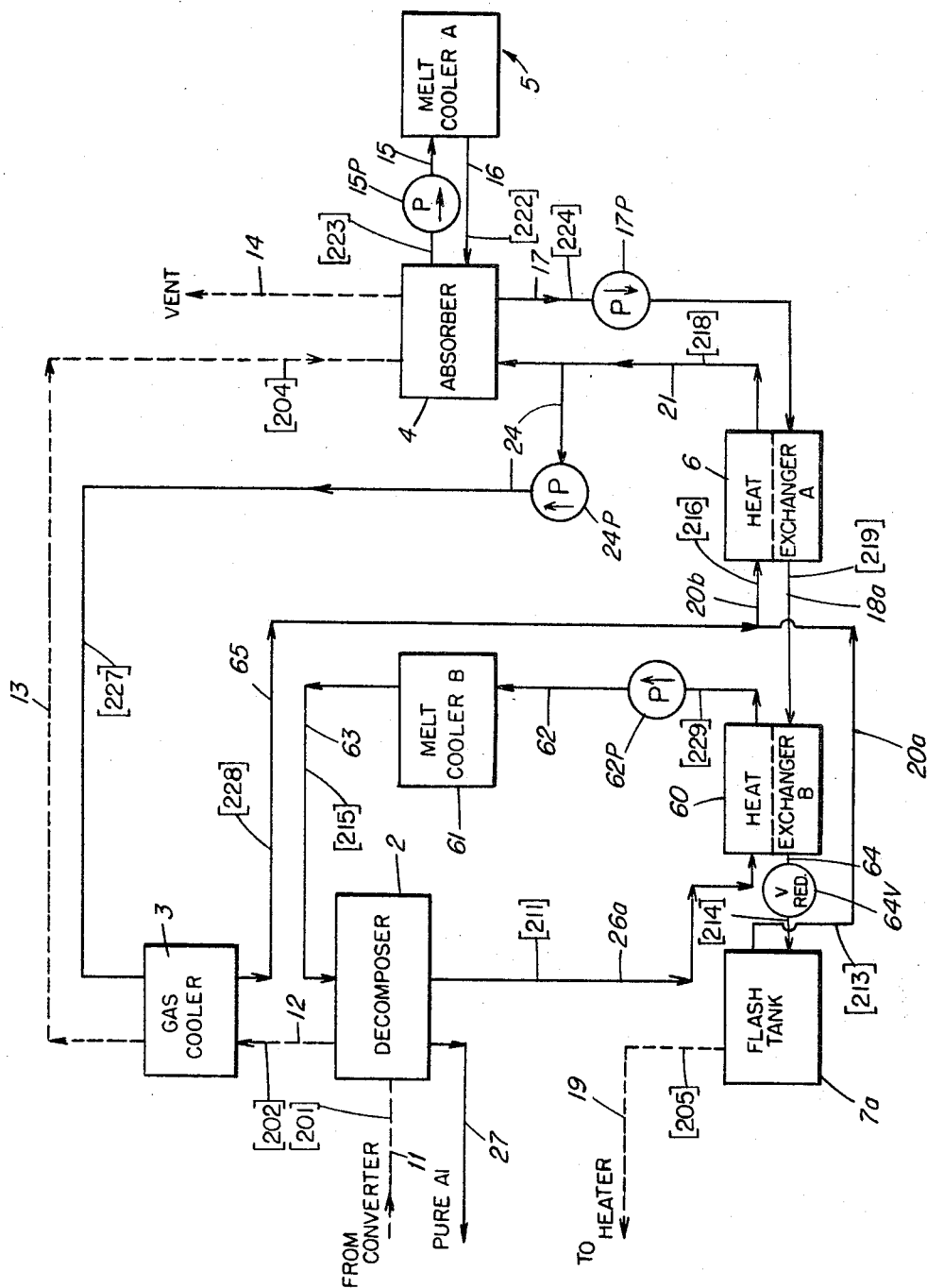
FIG. 2 is a diagram of principal elements of another system of the invention.

Certain modified systems and procedures of the invention are shown in FIGS. 2, 3 and 4, where identical or similarly functioning elements are designated by reference numbers identical or corresponding to the numbers in FIG. 1. Whereas in FIG. 1 the molten salt from the decomposer 2 is mixed with the enriched molten salt that reaches the flash tank A from the absorber 4, the operations in FIGS. 2, 3 and 4 contemplate circulation of the molten salt or other heat-transferring fluid from the decomposer directly back to it without such admixture. In such case, the heat transfer from this circulation, to effectuate evaporation of the normal halide, is achieved with appropriate heat exchange means, and the circulation of fluid, e.g. molten salt, through the decomposer is advantageously such (by the nature of the decomposer or the circumstances of its operation) that there is no evaporation of gas from or condensation of gas into such salt in the decomposer. It may be noted that in the system of FIG. 1, operating conditions of the decomposer 2, which are optimum in other respects, may involve some evaporation of trichloride from the traversing melt stream, such minor addition to the gas in the path 12–13, being recovered (for the melt) in the absorber.

Referring to FIG. 2, the general nature and operation, with the exceptions last noted above, may be the same with respect to the decomposer 2, gas cooler (melt heater) 3 and absorber 4. For simplicity, illustration of the converter and gas heater is omitted from FIG. 2 (and likewise from FIGS. 3 and 4), and similarly the auxiliary evaporator 10 in FIG. 1 is not shown, it being understood that such device may be employed, with suitable connections to the principal flash tank, in the same way as described for FIG. 1. The general function of the principal elements in FIG. 2 is the same as in FIG. 1. Thus monochloride-containing gas comes through duct 11 to the decomposer 2, where the reaction yields pure molten aluminum discharged in the duct 27 and a stream of aluminum trichloride gas, traversing duct 12, gas cooler 3 and duct 13 to the absorber 4, where it is condensed by absorption in molten salt mixture that is kept at the desired temperature by melt cooler 5, here specifically designated as melt cooler A, with the same pumping and duct connections 15P, 15 and 16.

Molten salt, enriched by the absorbed aluminum trichloride is pumped through the duct 17 by the pump 17P and through one side of the heat exchanger 6, here designated as heat exchanger A, leaving this heat exchanger via a duct 18a. The circuit of heat-removing melt through the decomposer 2 includes a discharge duct 26a leading through one side of a second heat exchanger 60, from which this melt flows via a further duct 62, a melt cooler 61 (designated melt cooler B) and a duct 63 back to the decomposer. The flow in this circuit is advanced by a suitable pump 62P as in the duct 62. In order to utilize the major heat content of the described decomposer coolant line, e.g. the highly heated melt leaving the decomposer in the duct 26a, the flow of enriched melt from the absorber, carried in the duct 18a, is brought through the device 60 in heat exchange relation with the first-mentioned melt and thence traverses the duct 64 to the flash tank 7a. A pressure reducing valve 64V is preferably included in the line 64, for the same function as the valve 18V of FIG. 1. Hence upon discharge of the rich melt in the flash tank 7a, having a very high temperature by reason of transfer of heat in the exchanger 60 and being reduced in pressure, this melt boils or flashes, generating the required, reestablished flow of high temperature aluminum trichloride gas in the duct 19, for return to the gas heater and converter. The valve 64V is adjusted, of course, to maintain sufficient pressure, after reduction, as is required for the re-supply of gas.

The return flow of lean salt from flash tank 7a is carried by a line consisting of successive ducts 20a and 20b, back to the heat exchanger 6, where it transfers heat to the forward flow of rich melt coming through the duct 17. The lean salt then returns to the absorber 4 through the duct 21.

For particularly advantageous results, the system of FIG. 2 includes a gas cooler 3, which serves to transfer heat from the decomposer exit gas to a supplemental melt stream which in this instance brings such heat, in effect, into the heat exchanger 6 for cooperation in raising the temperature of the enriched melt flow from the absorber 4. Specifically the melt circuit through the gas cooler 3 comprises the duct 24 leading from the return lean melt duct 21 and including the pump 24P, such duct extending to the gas cooler 3. From the latter heated melt traverses the duct 65, advantageously to join the duct system 20a, 20b, i.e. in that the duct 20b thus carries the flow from both ducts 20a and 65 into the heating side of heat exchanger 6, such lean salt circulation continuing (as explained above) through the duct 21. Hence the supplemental heat withdrawn from the gas cooler is brought into the lean salt return circuit, for aid in raising the temperature of the enriched salt, prior to its major, final heating in the heat exchanger 60.

The system and operation in FIG. 3 are essentially the same as in FIG. 2 (with identical elements designated by the same reference numbers), except that provision is here made whereby the reestablished normal aluminum halide gas may be characterized by an extremely high temperature. Specifically, in the circuit of melt or equivalent heat-transferring liquid through the decomposer 2, the flow of heated melt from the decomposer, in a duct 66 is arranged to traverse one side of a further heat exchange device 68, and then continue through a duct 70 to the heating side of the heat exchanger 60 where the major heat transfer is effected to the enriched salt flow for evaporation of aluminum trichloride gas therefrom in the flash tank 7a. The return melt circuit from the heat exchanger 60 to the decomposer 2 is the same as in FIG. 2.

The gas evolved in the flash tank 7a, departing through the duct 19a, traverses the other side of the heat exchanger 68, to yield a supply of gas at very high temperature, in the duct 19b leading to the gas heater and converter of the aluminum refining system. The heat transfer device 68, which may be designated heat exchanger C may be of any suitable type; for example it may, like heat exchanger 60, resemble the heat exchanger 6, or alternatively heat exchanger C may be a countercurrent gas-liquid contact device of the sort shown in FIG. 1 for the gas cooler 3 if appropriate provision is made, as by supplemental pumping and valve means (not shown), for maintaining desired pressure in the device 68, and providing also that the molten salt mixture or other liquid is appropriate for exposure to high temperature aluminum halide gas.

The procedure of FIGS. 2 and 3 will be apparent from the foregoing description, in that the principal operations and adjustments are essentially similar to what has been described for FIG. 1. The heat of decomposition of the monochloride in the decomposer 2 is transmitted to the enriched molten salt, primarily through heat exchanger B, for affectuating evaporation of the trichloride from such salt. Further and particularly significant heat recovery is achieved with heat exchanger A, for material contribution to the temperature of the enriched salt entering the flash tank via the duct 64, while additional heat is derived through the agency of the melt-heating stage in the gas cooler 3, such heat being utilized in these cases, in heat exchanger A. Effective temperature control, i.e. respecting the operations in the flash tank, may be had with adjustment of the flow through the duct 24, by means of the pump 24P. As explained, the system of FIG. 3 may be employed to obtain maximum temperature in the ultimately delivered normal halide gas stream. Thus for instance, where the heated melt or the like from the decomposer 2, leaving in duct 26a or duct 66, has a temperature of 850° C., representative operation of the process of FIG. 2 may yield a trichloride gas supply in duct 19 at about 700° C., but in FIG. 3, through duct 19b, at about 840° C.

FIG. 4 shows a simplified system, generally similar to FIG. 2, but omitting certain elements and steps as may be possible in some cases. Here the exit gas from the decomposer 2, i.e. consisting essentially of aluminum trichloride, travels through a duct 72 directly to the absorber 4, the gas cooler and its operation being omitted. Similarly, in the circuit of the melt or other heat transfer liquid through the decomposer 2, the melt cooler B of FIGS. 2 and 3 may be dispensed with in some cases, and is therefore here shown as omitted. Thus the melt circuit through the decomposer comprises a duct 26a leading heated melt to the heat exchanger 60, from which the flow returns in a duct 73, having a pump 73P, to the decomposer.

The forward flow of rich melt from heat exchanger 6 to flashk tank 7a traverses the duct 74, the heat-receiving side of heat exchanger 60 and duct 64. As shown, a pressure reducing valve 74V may be desirable in duct 74 as well as the reducing valve 64V in duct 64, to be sure there is no appreciable flashing of the rich melt in heat exchanger 6, due to the high temperature there attained. Indeed if desired, an additional reducing valve (not shown) may similarly be included in the duct 18a of FIGS. 2 and 3. Return lean melt from flash tank 7a travels to the heating side of heat exchanger 6 via a duct 20c, and then back to the absorber through duct 21.

The simplified procedure of FIG. 4 is essentially similar to basic operations in FIG. 2 and therefore need not be described in detail. The decomposer melt (or equivalent fluid) circuit is similarly isolated from that of the absorber, and in this instance all of the heat of decomposition that is to be employed for producing high temperature re-evaporated trichloride gas is delivered through heat exchanger B, with heat exchanger A, however, serving its important cooperating function (as in FIGS. 1, 2 and 3) for achievement of desirably high temperature in the flash tank. The system is simplified by omitting the gas cooler (melt heater), but correspondingly lacks certain functions thereof (including special convenience of control or regulation) as explained in connection with FIG. 1. Since the melt cooler B (of FIG. 2) is also omitted, the operation of melt cooler A should be designed to carry a relatively large cooling load.

It may be noted that the melt cooling operations in all of the systems are advantageous for receiving heat to be used elsewhere, as for example to generate steam. Thus typically with melt stream temperatures available as in the examples below, saturated steam at pressures up to 75 lbs. per square inch absolute can be generated from melt cooler 5 or A in the several systems shown. In operations as in FIGS. 2 and 3, melt cooler B (for the decomposer melt stream) can be employed to produce saturated steam at pressures up to 300 lbs. per square inch, one presently indicated use of melt cooler B being to generate superheated steam at pressures up to 800 lbs. per square inch absolute and temperatures up to 535° C.

As stated above, splash-type decomposers can be employed instead of devices such as illustrated in FIG. 1. FIGS. 5 and 6 show one example of an improved operation where the monohalide gas is decomposed by contact with splashing or spraying molten aluminum which receives the aluminum produced by decomposition. In the plan diagram of FIG. 5, monochloride-containing gas from the converter, entering through port 80, traverses successive chambers 81 (say, four, as shown) where it passes though violent sprays of liquid aluminum splashed up from a pool 82 (FIG. 6) of the metal, as by a pair of screw-type elements 83, 84, rotating on vertical axes, in each chamber (see FIG. 6). The chambers intercommunicate (for liquid and gas) as by doorways 85, and the exit gas being aluminum trichloride, flows through a port 86 at the opposite end of the row of chambers 81 from the port 80, the aluminum monochloride being decomposed by the heat-removing action of the splashed metal. A cooling well or chamber 87 extends along one side of the chambers 81, communicating through a tunnel to each below the metal level, as exemplified by tunnel 88 in FIG. 6, and also having breather holes 89, at an upper locality, into the chambers, to provide pressure equilibrium.

The cooling well 87 is filled with molten aluminum from the splash chambers 81 to a level above the tunnels 88 and also includes a layer of molten salt 90, which, depending on its density, may be above or below the metal, but is conveniently above it when such melt comprises the presently preferred molten mixture of aluminum trichloride and sodium chloride. The melt advantageously travels along the well 87 in heat exchange contact with the metal, for example entering at a port 91 at the same end where the gas leaves (port 86) and discharging at a port 92 at the opposite end, thus in effect countercurrent to the gas passage. The apparatus being constructed or arranged (as by the splasher action) to circulate metal from the chambers 81 into the well 87, as indicated at 93, the heat of monochloride cooling and decomposition is effectively transferred to and carried away by the melt 90. Molten aluminum, constituting the pure aluminum product, can be withdrawn from a suitable port 94 in the well 87.

The decomposer of FIGS. 5 and 6 may be used as in the device 2 in any of the systems of FIGS. 1 to 4, by connection of gas and melt supply and removal ducts to the corresponding ports 80, 86, 91 and 92, indication of such connection for FIG. 1 being shown by way of example. If operation is in accordance with a presently preferred mode for FIG. 1, conditions may be such that there is some transfer of evaporated aluminum trichloride from the molten salt (reducing its content of same by a small proportion) to the passing gas, through the breather holes 89. Where conditions contemplate no net change in the composition of the melt between the ends of the decomposer, as generally required for FIGS. 2, 3 and 4, there may be some absorption of trichloride gas into the melt in the melt entrance region, and corresponding evaporation in the melt exit region, all as permitted by the breather holes 89.

The further example of a novel and notably effective decomposer (and its procedure) in FIGS. 7, 8 and 9 comprises a like series of chambers 81, and splashers, gas ports and doorways, similarly identified. Instead of in a separate cooling well, the salt melt is introduced directly into the splashing chambers, for example through ports 95 at opposite ends of the series, adjacent the gas ports 80, 86. Thus the molten salt passes through the decomposer splash chambers intimately mixed with the molten aluminum, and a mixture of melt and metal is splashed in each zone to effectuate removal of heat for the decomposition, and removal of the produced aluminum in the metal phase of the mixture. Adjoining well structure is provided for discharge of melt and removal of metal as produced, as for example the closed wells 96, 97, respectively adjacent two central splash chambers for corresponding separation of metal and salt. The wells 96, 97 communicate with each other through a doorway 98 and with the melt-metal pool 99 in the chambers 81 through tunnels 100, 101 respectively, and in the wells the melt collects in a layer 102, e.g. above the mix, for continuous discharge from a port 103 in the well 97. Metal similarly collects in a bottom layer 104 at a sunken portion of the well 96, for withdrawal as product through a port 105. The wells 96, 97 have pressure-equalizing breather holes 106, 107 into the adjacent splash chambers 81.

The apparatus of FIGS. 7 to 9, which has an aspect of preference because of its smaller size, is appropriate for inclusion in the systems of the present invention (exemplified in FIGS. 1 to 4) by similar connections as for FIGS. 5 and 6. Thus for instance FIG. 7 shows like connection of gas and melt ducts to the decomposer 2 of FIG. 1, the incoming melt duct 25 extending through two branches 25a and 25b to the ports 95. If desired, aluminum and salt can be discharged at different temperatures; for instance, with the separating wells or zones 96, 97 arranged as in FIG. 7, metal is drawn off through port 105 at a lower temperature, e.g. 750° C. than that, say 850° C., of the hot melt through port 103.

While the procedures and apparatus herein described have special advantage for the circulation of aluminum trichloride in the refining or so-called distilling process where aluminum is transported as the monochloride (the invention, in some specific respects, being thus related to monochloride refining), they are applicable to corresponding operation with aluminum tribromide for conversion of aluminum to the monobromide and decomposition of the latter, the subhalide process thus being considered generically as one wherein the halide is of halogen selected from the group consisting of chlorine and bromine. The molten salt mixtures, where made or employed so as to contain normal aluminum halide (chloride or bromide or both), e.g. molten salt mixtures used for absorbing and evaporating normal aluminum halide gas (of single or mixed composition) in the present procedures for recirculation of halide from the decomposer to the converter, should thus usually consist of halides of halogen of the stated group. That is to say, appropriate halides for the melt are chloride, bromide and mixtures thereof.

Suitable compositions for the molten salt thus consist of normal aluminum halide and one or more other metal halides, selected and in proportions (as readily determinable from known chemical and physical properties, and indeed from previous disclosures of salt melts for the subhalide process, such as mentioned hereinabove) to be stable and molten, and to afford absorption and release of the normal halide, under appropriate conditions. An unusually suitable melt consists of aluminum trichloride and sodium chloride; other examples of metal halides useful in combination with the aluminum halide are those of alkali and alkaline-earth metals (including magnesium) appropriately selected as the chloride and bromide. Other specific instances of melt compositions are a mixture of aluminum chloride and potassium chloride, and a ternary mixture of aluminum, potassium and sodium chlorides. For mixture with the aluminum halide one or more halides of alkali metals (e.g. Na, K, Li) are presently preferred and have the common property of providing melts lighter than molten aluminum. A molten mixture of aluminum tribromide and barium bromide is an example of a melt that has a higher specific gravity than molten aluminum and that would be arranged to collect below the aluminum in certain decomposers shown in the drawings. In general the salt mixture may be described as one which consists essentially of normal aluminum halide and other metal halide (of halogen selected from the above group, and thus being chlorine, bromine, or both), and which in molten state is capable of absorption of normal aluminum halide therein and of evaporation of normal aluminum halide therefrom.

For the circuits (e.g. to and from the decomposer) where the heat-transfer liquid does not absorb or release normal aluminum halide gas and does not mix with the salt melt of the absorber circuit, and indeed specifically with some known types of decomposers employing coolant liquid isolated from exposure to the halide gases, the above mixtures are still unusually suitable, but other compositions, lacking aluminum halide, can also be used. It is conceived that many molten salts or mixtures thereof can be employed in such cases, or in fact other materials which are liquid at the required temperatures and are suitably inert to the materials with which they must come in contact.

Specific examples of the procedure of the invention as applied to monochloride refining, are described below in reference to one or another of FIGS. 1 to 4. In each instance, circulation of aluminum trichloride is provided in a highly trouble-free manner, reestablishing the gas (for supply to the heater and thence to the converter) at temperatures of 600° C. and upwards, preferably at least 700° C., an important, specific advantage of the invention being the delivery of the trichloride gas at temperatures in such range up to 1000° C. or so. The procedure and apparatus are nevertheless useful where the gas is evaporated at lower temperatures, e.g. 400° C. and below.

In these examples, the salt melts conveniently consist of mixtures of aluminum trichloride and sodium chloride, and compositions of these and of gas mixtures are stated in terms of mol percent of the ingredients, such values being readily convertible to weight percent if desired. In all instances, the decomposing reaction is carried out so that the heated melt leaves decomposer 2 at a temperature well above the melting point (which is about 660° C.) of pure aluminum, it being usually very desirable to remove the metal product in molten form. The gas received from the converter in each case is a mixture of aluminum trichloride and aluminum monochloride, having proportions (and temperature) governed by the percent conversion, a term signifying that percentage of the supplied molar input of $AlCl_3$ which is converted to $AlCl$, pursuant to the known governing equation under which complete (100%) conversion means that no mole of $AlCl_3$ is converted to 3 mols of $AlCl$.

For ease of comparison, all of the examples are related to the production of one ton of pure aluminum metal per hour, drawn off in molten state at atmospheric pressure through the pipe 27. Compositions of the gas flows from the converter to the absorber are given neglecting their usual, very minor content of permanent gases (such as hydrogen, methane or the like), which may be assumed to be vented through the duct 14 (at 200° C., except in Example V at 475° C.) at about 100 cubic feet per hour.

The data for process material flows are related to various localities in the gas and melt circuits, and for brevity in the description and tabulation of the examples hereinbelow, such localities (for the several views of FIGS. 1 to 4) are denominated by special numbers, shown in brackets in the drawings, in accordance with the following index table:

TABLE 1—INDEX

| Locality No: | Description |
|---|---|
| 201 | Gas into decomposer 2, duct 11 |
| 202 | Gas out of decomposer 2, duct 12 |
| 203 | Gas into gas cooler 3, duct 12 |
| 204 | Gas into absorber 4, duct 13 or 72 |
| 205 | Gas out of flash tank 7 or 7a, duct 19 or 19a |
| 206 | Gas out of heat exchanger 68, duct 19b |
| 207 | Gas out of flash tank 9, duct 32 |
| 211 | Melt out of decomposer 2, duct 26, 26a or 66 |
| 212 | Melt out of heat exchanger 68, duct 70 |
| 213 | Melt (lean) out of flash tank 7 or 7a, duct 20, 20a or 20c |
| 214 | Melt (rich) into flash tank 7 or 7a, duct 18 or 64 |
| 215 | Melt into decomposer 2, duct 63 or 73 |
| 216 | Melt (lean) into heat exchanger 6, duct 20, 20b or 20c |
| 217 | Melt (rich) into heat exchanger 6, duct 17 |
| 218 | Melt (lean) out of heat exchanger 6, duct 21 |
| 219 | Melt (rich) out of heat exchanger 6, duct 18, 18a or 74 |
| 220 | Melt (rich) into heat exchanger 60, duct 18a or 74 |
| 221 | Melt (lean) into absorber 4, duct 21 |
| 222 | Melt (from cooler) into absorber 4, duct 16 |
| 223 | Melt (to cooler) out of absorber 4, duct 15 |
| 224 | Melt (rich) out of absorber 4, duct 17 |
| 225 | Melt into flash tank 9, duct 22 |
| 226 | Melt out of flash tank 9, duct 23 |
| 227 | Melt into gas cooler 3, duct 24 |
| 228 | Melt out of gas cooler 3, duct 65 |
| 229 | Melt out of heat exchanger 60, duct 62 or 73 |

Example I

In this example, procedure is as described above for FIG. 1, with incoming gas in duct 11 being 50.4 mol percent $AlCl_3$ and 49.6 mol percent $AlCl$, from conversion at slightly below 25%. Beyond the decomposer 2, the gas flows at localities 202, 203, 204 and 205 are considered as 100% $AlCl_3$, the same being true in all other examples below. Gas enters the decomposer 2 at a pressure of 1 atmosphere, the cooler 3 at 0.5 atmosphere, and the absorber 4 at 0.3 atmosphere; on evaporation from the flash tank, the $AlCl_3$ gas is delivered in duct 19 at 1.5 atmospheres and 650° C. Melt pressures into and out of the absorber 4 (localities 221–224) are 0.3 atmosphere (and 0.5 atmosphere entering flash tank 9) and in the ducts into and out of the flash tank 7 (localities 213, 214, 216) 1.5 atmospheres, the melt which leaves the decomposer rising from 1 atmosphere there to the desired 1.5 atmospheres in the tank. The rich melt, from pump 17P, enters heat exchanger 6 at 5 atmospheres (217), leaves at 4 atmospheres (219) and is dropped by valve 18V to 1.5 atmospheres (214), as above.

The hot melt from the decomposer (211) has a composition of $AlCl_3$ 50.4 mol percent and NaCl 49.6 mol percent. In the rich melt (localities 214, 217, 219, 222, 223 and 224) the corresponding mol percentages are 62.0 and 38.0, and in the lean melt (213, 216, 218, 221, 225 and 227) are 52.1 and 47.9. The temperatures and rates of flow are as stated in the tables below. It may be noted here that operation according to FIG. 1 has a further advantage, in generally requiring no heat exchange to operate at the highest temperatures.

Example II

Except as noted below, operation and conditions are as described for Example I, again following procedure as in FIG. 1. Here $AlCl_3$ gas is delivered in duct 19 at 600° C. and 1.5 atmospheres. Pump 17P may advance the rich melt at somewhat less than 5 atmospheres (217), with other melt and gas pressures as before. The mol percentage proportions of $AlCl_3$ and NaCl in the melt flows are 48.2 to 51.8 at locality 211, 65.0 to 35.0 for the rich melt and 52.7 to 47.3 for the lean melt, at the same localities as specified under Example I. Other values are as tabulated below.

Example III

Operation and conditions are for the procedure of FIG. 1, but utilizing a countercurrent arrangement of hot melt and evolving gas in flash tank A, such as in FIG. 1–A, so that $AlCl_3$ gas is delivered in duct 19 at a high temperature, viz 750° C. at 1.5 atmospheres, well above that at which the lean melt leaves in duct 20 (here 680° C.).

Incoming converter gas (duct 11) at 1250° C. and 1 atmosphere represents 25% conversion, having approximately 50 mol percent each of $AlCl_3$ and AlCl. Pressure of gas or melt flows is about 1 atmosphere at localities 201, 203, 204, 211, 218, 221–224 and 227, 1.5 atmospheres at localities 205, 213, 214, 216 and 225, and about 6.7 atmospheres at 217 and 219. The mol percent proportions of $AlCl_3$ and NaCl in the melt flows are 49.5 to 50.5 at 211, 62.0 to 38.0 for the rich melt and 53.0 to 47.0 for the lean melt, at localities as in Example I. Other values are as tabulated below.

Example IV

Here again operations and conditions are for FIG. 1, performed without the countercurrent flash tank feature, but set to provide delivery of reestablished $AlCl_3$ gas in duct 19 at 700° C. and 1.5 atmospheres. Mol percent compositions of input gas (25% conversion), and other gases and melts, and pressure conditions, are as stated for Example III except that the lean melt flows are $AlCl_3$ 52.6 mol percent and NaCl 47.4 mol percent, and the melt pressure at localities 217 and 219 is about 7.5 atmospheres. Other values are as tabulated below.

Example V

In this example (see FIG. 1) the gas cooler (melt heater) 3 is omitted, either by omitting the device itself or by simply not operating the pump 24P. Under such circumstances a high temperature of $AlCl_3$ gas in the converter supply duct 19 is nevertheless obtained, i.e. 690° C. at 1.5 atmospheres, when (as in this example) the converter operates at higher conversion, viz 46%, delivering gas in duct 11 at 1300° C. containing $AlCl_3$ 28.3 mol percent and AlCl 71.5 mol percent. Pressures in gas and melt flows are generally the same as in Examples III and IV (including 1 atmosphere at 207 and 226), except that the pressure of melt at 217 and 219 is about 3.5 atmospheres. The composition of melt at locality 211 is likewise the same, but the mol percentages of $AlCl_3$ and NaCl are 57.0 to 43.0 for the rich melt and 53.0 to 47.0 for the lean melt, the latter becoming slightly leaner (52.0 to 48.0) in leaving flash tank 9 (at 226), as indeed likewise in the preceding examples. Other values are as tabulated below.

Example VI

Here procedure is followed as in FIG. 2, employing a closed, heat-transferring melt circulation through the decomposer 2 and heat exchanger (B) 60, at approximately atmospheric pressure (211, 229, 215) and constant composition, e.g. $AlCl_3$ 49.5 mol percent and NaCl 50.5 mol percent. Composition and pressure of gas received from the converter, and of gas from decomposer 2 to absorber 4, are as in Examples III and IV, the operation here being such as to produce $AlCl_3$ gas in duct 19 at 700° C. and 1.5 atmospheres. Pressures in the melt circuits that include heat exchanger 6, absorber 4 and gas cooler 3 are also like those for corresponding localities in Examples III and IV, except that the rich melt is pumped into heat exchanger 6 at 13 atmosphere, and leaves heat exchanger 60 at 9 atmospheres, dropping to 1.5 atmospheres as it enters flash tank 7a. The compositions of rich melt (214, 219, 222–224) and of lean melt (213, 216, 218, 221, 227 and 228) are the same as in Example IV. Other values are as tabulated below.

Example VII

The procedure is that of FIG. 3, including the further heat exchange step (in device 68) between the hot melt from the decomposer 2 and the gas evolved in the flash tank 7a, so that the $AlCl_3$ gas delivered in duct 19b for supply to the gas heater and converter may have a very high temperature, viz 840° C. at 1.5 atmospheres. The compositions and pressures of gas and melt flows at all other localities are the same as at corresponding places in the operation of Example VI. Values of temperature and rate of flow of gases and melts are as tabulated below.

Example VIII

The operations and conditions are for FIG. 4, which omits the gas cooler (melt heater) step and likewise melt cooler B of FIGS. 2 and 3. The $AlCl_3$ gas is produced for converter supply (duct 19) at 700° C. and 1 atmosphere. Gas compositions (including the monochloride-containing gas from the converter, at 201) and gas and melt flow pressures are the same as for corresponding localities in Examples VI and VII, except that the rich melt, entering heat exchanger 6 at 13 atmospheres (locality 217) is dropped to 4.7 atmospheres as it enters heat exchanger 60 (locality 220). Compositions of closed circulating melt, rich melt and lean melt are also the same as in Examples VI and VII. Other values are as tabulated below.

The following tables set forth the temperatures (in degrees C.) and rates of flow (in tons per hour) of various gas and melt streams in Examples I to VIII, at the localities (as pertinent in each instance) designated by reference numbers of Table 1, also shown on FIGS. 1 to 4.

TABLE 2 (FIG. 1)

| Loc. No. | Example I | | Example II | | Example III (Fig. 1-A) | | Example IV | | Example V | |
|---|---|---|---|---|---|---|---|---|---|---|
| | Temp., °C. | Rate, tons/hr. | Temp., °C. | Rate, tons/hr. | Temp., °C. | Rate, tons/hr. | Temp., °C. | Rate, tons/hr. | Temp., °C. | Rate, tons/hr. |
| 201 | 1,250 | 11 | 1,250 | 11 | 1,250 | 11 | 1,250 | 11 | 1,300 | 6.5 |
| 202 | 650 | 14.5 | 600 | 15 | 670 | 13.5 | 670 | 11.1 | 670 | 8.4 |
| 203 | 650 | 14.5 | 600 | 15 | 670 | 14.8 | 670 | 14.6 | | |
| 204 | 450 | 14.5 | 500 | 15 | 450 | 14.8 | 450 | 14.6 | 670 | 9.9 |
| 205 | 650 | 10 | 600 | 10 | 750 | 10 | 700 | 10 | 690 | 5.5 |
| 207 | | | | | 670 | 1.3 | 670 | 3.5 | 660 | 1.5 |
| 211 | 750 | 92.3 | 850 | 37.4 | 850 | 48 | 850 | 48 | 850 | 40.6 |
| 213 | 650 | 137.5 | 600 | 73.9 | 680 | 92.5 | 700 | 94.8 | 680 | 121.4 |
| 216 | 650 | 57.9 | 600 | 48.3 | 680 | 50 | 700 | 52.8 | 680 | 76.4 |
| 218 | 350 | 57.9 | 400 | 48.3 | 236 | 50 | 238 | 52.8 | 490 | 76.4 |
| 219 | 519 | 55.2 | 417 | 46.5 | 607 | 54.5 | 630 | 56.8 | 643 | 86.3 |
| 221 | 350 | 40.7 | 400 | 31.5 | 236 | 39.7 | 238 | 42.2 | 490 | 76.4 |
| 222 | 150 | 241 | 150 | 275 | 150 | 240 | 150 | 241 | 350 | 67 |
| 223 | 200 | 241 | 200 | 275 | 200 | 240 | 200 | 241 | 475 | 67 |
| 224 | 200 | 55.2 | 200 | 46.5 | 200 | 54.5 | 200 | 56.8 | 475 | 86.3 |
| 225 | 650 | 79.6 | 600 | 25.6 | 680 | 42.5 | 700 | 42 | 680 | 45 |
| 226 | 650 | 79.6 | 600 | 25.6 | 670 | 41.2 | 670 | 38.5 | 660 | 43.5 |
| 227 | 350 | 17.2 | 400 | 16.8 | 236 | 10.3 | 238 | 10.6 | | |

TABLE 3

| Loc. No. | Example VI (Fig. 2) | | Example VII (Fig. 3) | | Example VIII (Fig. 4) | |
|---|---|---|---|---|---|---|
| | Temp., °C. | Rate, tons/hr. | Temp., °C. | Rate, tons/hr. | Temp., °C. | Rate, tons/hr. |
| 201 | 1,250 | 11 | 1,250 | 11 | 1,250 | 11 |
| 202 | 670 | 10 | 670 | 10 | | |
| 204 | 370 | 10 | 370 | 10 | 670 | 10 |
| 205 | 700 | 10 | 700 | 10 | 700 | 10 |
| 206 | | | 840 | 10 | | |
| 211 | 850 | 55.5 | 850 | 55.5 | 850 | 55.5 |
| 212 | | | 812 | 55.5 | | |
| 213 | 700 | 29.7 | 700 | 29.7 | 700 | 29.7 |
| 214 | 792 | 39.7 | 792 | 39.7 | 792 | 39.7 |
| 215 | 660 | 55.5 | 660 | 55.5 | 660 | 55.5 |
| 216 | 670 | 43.2 | 670 | 43.2 | | |
| 218 | 258 | 43.2 | 258 | 43.2 | 250 | 29.7 |
| 219 | 650 | 39.7 | 650 | 39.7 | 536 | 39.7 |
| 221 | 258 | 29.7 | 258 | 29.7 | | |
| 222 | 150 | 161 | 150 | 162 | 150 | 250 |
| 223 | 200 | 161 | 200 | 162 | 200 | 250 |
| 224 | 200 | 39.7 | 200 | 39.7 | 200 | 39.7 |
| 227 | 258 | 13.5 | 258 | 13.5 | | |
| 228 | 603 | 13.5 | 603 | 13.5 | | |
| 229 | 723 | 55.5 | 685 | 55.5 | 660 | 55.5 |

It is to be understood that the invention is not limited to the specific operations and structures herein shown and described, but may be carried out in other ways without departure from its spirit.

We claim:

1. A method of recirculating normal aluminum halide in the aluminum refining process wherein hot gaseous normal aluminum halide is reacted with aluminum-containing material to yield a flow of gas containing aluminum monohalide, comprising:

(A) decomposing said monohalide by
  (1) advancing said gas flow through a first region and
  (2) removing heat from said gas flow in said region, thereby
    (a) producing aluminum metal, and
    (b) delivering a first further gas flow comprising normal aluminum halide,
  (3) said heat removing step comprising transferring heat of said monohalide decomposition into a fluid;

(B) absorbing gaseous normal aluminum halide of said further gas flow, in a second region, into molten salt mixture that contains normal aluminum halide;

(C) bringing quantities of said molten salt mixture advanced from said second region and quantities of the aforesaid fluid that has been heated by said heat transferring step into heat exchange relation, and thereby
  (1) delivering heat into said advanced molten salt mixture, to elevate it substantially in temperature, and
  (2) causing evaporation of normal aluminum halide in gaseous state from said advanced molten salt mixture with the aid of said last-mentioned heat and at elevated temperature, for delivering a re-established flow of gaseous normal aluminum halide; and (D) continuing an advance of molten salt mixture remaining from said evaporating step as a return flow to said second region while (E) transferring remaining heat from said return flow of molten salt mixture to the first-mentioned, advanced quantities of molten salt mixture to effect a preliminary elevation of the temperature of said first-mentioned advance quantities for promoting the aforesaid evaporation of normal aluminum halide at elevated temperature therefrom.

2. A method as defined in claim 1, which includes:

(F) advancing a portion of the aforesaid return flow of molten salt mixture after the aforesaid heat transfer from said return flow, as a second flow of molten salt mixture;

(G) bringing said second flow of salt mixture into heat exchange relation with the aforesaid first further gas flow and thereby transferring heat from said first further gas flow to said second flow of salt mixture; and (H) thereafter transferring heat from said second flow of salt mixture in aid of the aforesaid evaporation by returning said portion of salt mixture, heated as aforesaid, which constitutes said second flow thereof, into admixture with the aforesaid molten salt mixture which has been advanced from the second region and is continued as the first-mentioned return flow of mixture, at a locality upstream of the first-mentioned heat transfer from said first-mentioned return flow of mixture.

3. A method as defined in claim 2, in which the fluid which is heated by the decomposing step is molten salt mixture containing normal aluminum halide and is provided as a third, heat-removing flow of said mixture:

(I) said third, heat-removing flow being constituted by
  (1) withdrawing a portion of the aforesaid first-mentioned return flow of molten salt mixture and
  (2) circulating said so-constituted third flow past and in heat absorbing relationship to the aforesaid first region as the aforesaid fluid; and (J) said third flow being thereafter brought into admixture, in a third region, with the aforesaid quantities of molten salt mixture advanced from the second region to effectuate the aforesaid delivery of heat for causing the aforesaid halide evaporation, in said third region, the molten salt mixture of said heat-removing flow thereby becoming again a part of the first-mentioned return flow of molten salt mixture.

4. A method as defined in claim 3, in which the aforesaid second flow of molten salt mixture which is brought into heat exchange relation with the aforesaid further gas flow is returned by bringing it into the third flow of molten salt mixture as the latter circulates past the first region, the portion of molten salt mixture which constitutes said second flow thereby becoming a part of the third flow into the third region and of the first-mentioned return flow initiated from said third region.

5. A method as defined in claim 1, which includes:
  (F) advancing a flow of the aforesaid heated fluid from said first region to a locality where it is brought into the aforesaid heat exchange relation causing evaporation with the quantities of molten salt mixture from the second region; and
  (G) bringing said flow of heated fluid, intermediate said first region and said locality, into heat exchange relation with the aforesaid re-established flow of gaseous normal halide, and thereby transferring some heat of said fluid for elevating the temperature of said re-established gaseous halide.

6. A method as defined in claim 5, which includes:
  (H) advancing a portion of the aforesaid return flow of molten salt mixture after the aforesaid heat transfer from said return flow, as a second flow of molten salt mixture;
  (I) bringing said second flow of salt mixture into heat exchange relation with the aforesaid first further gas flow and thereby transferring heat from said first further gas flow to said second flow of salt mixture; and
  (J) thereafter returning said second flow of salt mixture to the aforesaid return flow of mixture, at a locality upstream of the aforesaid heat transfer from said return flow of mixture, for thereby increasing the quantity of heated mixture available for said heat transfer therefrom.

7. A method of decirculating normal aluminum halide in the aluminum refining process wherein hot gaseous normal aluminum halide is reacted with aluminum-containing material to yield a flow of gas containing aluminum monohalide, comprising:
  (A) decomposing said monohalide by
    (1) advancing said gas flow through a first region and
    (2) removing heat from said gas flow in said region, thereby
      (a) producing aluminum metal, and
      (b) delivering a further gas flow that comprises normal aluminum halide and has a characteristic pressure,
    (3) said heat removing step comprising transferring heat of said monohalide decomposition into a first quantity of molten salt mixture that contains normal aluminum halide;
  (B) absorbing gaseous normal aluminum halide of said further gas flow, in a second region, into a second quantity of molten salt mixture that contains normal aluminum halide;
  (C) advancing first and second flows of molten salt mixture respectively from said first and second quantities and delivering said first and second flows into admixture with each other in a third, confined region and at a pressure substantially higher than the said characteristic pressure, and thereby
    (1) delivering into said admixed flows of molten salt mixture heat derived from said heat transferring step, to establish a third quantity of molten salt mixture in said third region having a temperature substantially elevated above the temperature of the aforesaid second flow of molten salt mixture which has been admixed in said third quantity, and
    (2) causing evaporation of normal aluminum halide in gaseous state from said third quantity of molten salt mixture in said third region with the aid of said last-mentioned heat and at elevated temperature, for delivering a re-established flow of gaseous normal aluminum halide that has the aforesaid substantially higher pressure; and
  (D) returning molten salt mixture from said third region to said first and second quantities thereof.

8. A method as defined in claim 7, in which said return of molten salt mixture from said third region to said first quantity thereof comprises:
  (E) advancing a flow of molten salt mixture from said third region through a fourth region while
    (1) reducing the pressure of said last-mentioned advanced molten salt mixture to a value substantially agreeing with the aforesaid characteristic pressure and
    (2) thereby permitting further evaporation of normal aluminum halide from said last-mentioned molten salt mixture in said fourth region; and
  (F) thereafter advancing said last-mentioned molten salt mixture from said fourth region to said first quantity of mixture for replenishing said first quantity.

9. A method as defined in claim 7, in which said return of molten salt mixture to said second quantity thereof is effected by
  (E) advancing said last-mentioned return of molten salt mixture, as a third flow, to said second quantity while
  (F) transferring remaining heat from said third flow of mixture into the aforesaid second flow of mixture to heat said second flow for promoting said evaporation of halide gas therefrom at elevated temperature.

10. A method as defined in claim 9, in which the aforesaid return of molten salt mixture to the first quantity thereof is effected in at least two portions respectively advanced as fourth and fifth flows of molten salt mixture to said first quantity, by
  (G) advancing said fourth flow substantially directly from said third region to said first region, and by
  (H) withdrawing said fifth flow from the aforesaid third flow of molten salt mixture after the aforesaid transfer of heat from the third flow to the second flow has been effected, and thereafter
    (1) advancing said fifth flow to said first quantity while
    (2) transferring heat to said fifth flow from the aforesaid further gas flow that is delivered from the first region.

11. A method as defined in claim 10, in which
  (I) said fourth flow of molten salt mixture, in its advance from said third region to said first quantity of mixture, is advanced through a fourth region while
    (1) reducing the pressure of the molten salt mixture of said fourth flow to a value substantially agreeing with the aforesaid characteristic pressure in the first region and thereby
    (2) permitting further evaporation of normal aluminum halide, from said salt mixture in said fourth region.

12. A method of recirculating normal aluminum halide in the aluminum refining process wherein hot gaseous normal aluminum halide is reacted with aluminum-containing material to yield a flow of gas containing aluminum monohalide, comprising:
  (A) decomposing said monohalide by
    (1) advancing said gas flow through a first region and
    (2) removing heat from said gas flow in said region, thereby
      (a) producing aluminum metal, and
      (b) delivering a further gas flow that comprises normal aluminum halide and has a characteristic pressure;
  (B) absorbing gaseous normal aluminum halide of said further gas flow, in a second region, into molten salt mixture that contains normal aluminum halide, to produce a molten salt mixture that is enriched in normal aluminum halide and is capable of evaporation of normal aluminum halide therefrom;

(C) advancing a flow of said enriched molten salt mixture from said second region into a third region at a pressure substantially higher than said characteristic pressure, while transferring, to said advanced enriched mixture, heat of said monohalide decomposition which was removed in the first region, and thereby
    (1) causing evaporation of normal aluminum halide in gaseous state and at elevated temperature from said advanced enriched molten salt mixture in said third region with the aid of said last-mentioned heat transferred thereto, for delivering a re-established flow of gaseous normal aluminum halide that has the aforesaid substantially higher pressure, and
    (2) establishing molten salt mixture in said third region, which is substantially elevated in temperature relative to the aforesaid flow of enriched mixture and which has been rendered lean in normal aluminum halide;

(D) advancing a return flow of said lean, elevated-temperature molten salt mixture from said third region to said second region; and (E) transferring heat from said return flow of lean molten salt mixture to the first-mentioned flow of enriched molten salt mixture, prior to the aforesaid transfer of heat of monohalide decomposition to said enriched mixture, to effect a preliminary elevation of the temperature of said first-mentioned flow of enriched mixture for promoting the aforesaid evaporation of normal aluminum halide at elevated temperature therefrom.

13. A method as defined in claim 12, which includes:
(F) advancing a portion of said return flow of lean molten salt mixture, from a point downstream of the locality of the aforesaid heat transfer from said return flow, as a further flow of molten salt mixture;
(G) bringing said further flow of molten salt mixture into heat exchange relation with the aforesaid further gas flow and thereby transferring heat from said further gas flow to said further flow of salt mixture; and
(H) thereafter returning said further flow of mixture to the first-mentioned return flow of lean molten salt mixture at a point upstream of the aforesaid locality, for thereby increasing the heat available for the aforesaid heat transfer from the return flow of lean mixture to the first-mentioned flow of enriched mixture.

14. A method of recirculating normal aluminum halide in the aluminum refining process wherein hot gaseous normal aluminum halide is reacted with aluminum-containing material to yield a flow of gas containing aluminum monohalide, comprising:
(A) decomposing said monohalide by
    (1) advancing said gas flow through a first region and
    (2) removing heat from said gas flow in said region, thereby
        (a) producing aluminum metal, and
        (b) delivering a further gas flow comprising normal aluminum halide,
    (3) said heat removing step comprising advancing a first molten salt mixture past said region while transferring heat of said monohalide decomposition into said first mixture;
(B) absorbing gaseous normal aluminum halide of said further gas flow, in a second region, into a second molten salt mixture that contains normal aluminum halide, to produce a molten salt mixture that is enriched in normal aluminum halide and is capable of evaporation of normal aluminum halide therefrom;

(C) advancing a flow of said last-mentioned, enriched molten salt mixture from said second region and a flow of said first molten salt mixture, from said first region, that has been heated by said heat-removing step, into heat exchange relation with each other while preventing mutual contact of said enriched salt mixture and said heated first salt mixture, and thereby
    (1) delivering heat into said enriched molten salt mixture, to elevate it substantially in temperature, and
    (2) causing evaporation of normal aluminum halide in gaseous state from said enriched molten salt mixture with the aid of said last-mentioned heat and at elevated temperature, for delivering a re-established flow of gaseous normal aluminum halide;

(D) recirculating a return flow of said first molten salt mixture from said heat exchange relation, for the aforesaid advance past said first region; and (E) recirculating a return flow of the molten salt mixture from which normal aluminum halide has been evaporated and which has been rendered lean in normal aluminum halide by said evaporation, to said second region for said absorption of gaseous halide.

15. A method as defined in claim 14, in which:
(F) said recirculation of a return flow of lean molten salt mixture to said second region includes
    (1) bringing said last-mentioned return flow of lean salt mixture into heat exchange relation with the aforesaid flow of enriched molten salt mixture from the second region and thereby
    (2) transferring remaining heat from said lean mixture into the aforesaid enriched mixture for promoting said evaporation of halide gas from said enriched mixture at elevated temperature.

16. A method as defined in claim 15, which includes:
(G) advancing a portion of said return flow of lean molten salt mixture after the last-mentioned heat exchange step between said lean mixture and said enriched mixture, as a further flow of molten salt mixture;
(H) bringing said further flow of molten salt mixture into heat exchange relation with the aforesaid further gas flow and thereby transferring heat from said further gas flow to said further flow of salt mixture; and
(I) thereafter returning said further flow of mixture to the first-mentioned return flow of lean mixture upstream of the locality of the aforesaid heat exchange step between the lean mixture and the rich mixture, for thereby increasing the quantity of heat available for transfer to said enriched molten salt mixture.

17. A method of recirculating normal aluminum halide in the aluminum refining process wherein hot gaseous normal aluminum halide is reacted with aluminum-containing material to yield a flow of gas containing aluminum monohalide, comprising:
(A) decomposing said monohalide by
    (1) advancing said gas flow through a first region and
    (2) removing heat from said gas flow in said region, thereby
        (a) producing aluminum metal, and
        (b) delivering a further gas flow comprising normal aluminum halide,
    (3) said heat removing step comprising transferring heat of said monohalide decomposition into a fluid;
(B) absorbing gaseous normal aluminum halide of said further gas flow, in a second region, into molten salt mixture that contains normal aluminum halide;
(C) bringing quantities of said molten salt mixture, enriched in normal aluminum halide and advanced from said second region, and quantities of the aforesaid fluid that has been heated by said heat transferring step into heat exchange relation, and thereby (1) delivering heat into said advanced molten salt mixture, to elevate it substantially in temperature, and (2) causing evaporation of normal aluminum halide in gaseous state from said advanced molten salt mixture with the aid of said last-mentioned heat and at elevated temperature, for delivering a re-established flow of gaseous normal aluminum halide; and (D) returning lean molten salt mixture from said evaporating step to said second region, (E) said operation of bringing quantities of said heated fluid from the heat transferring step to the aforesaid heat exchange relation comprising (1) advancing a flow of said heated fluid while bringing it into preliminary heat exchange relation with said re-established flow of gaseous normal halide, and thereby (2) transferring some heat of said fluid for elevating the temperature of said re-established gaseous halide.

18. A method as defined in claim 17, which includes:

(F) advancing a portion of lean molten salt mixture from said evaporating step to and through the aforesaid first region to constitute the aforesaid fluid which is heated by transfer thereto of the heat of monohalide decomposition, the aforesaid flow of heated fluid thereby becoming a flow of heated molten salt mixture;

(G) the bringing of heated fluid, which is constituted by said heated lean salt mixture, into the first-mentioned heat exchange relation with the aforesaid enriched salt mixture being effected by (1) advancing said enriched salt to a third region, and (2) effecting the advance of the flow of said heated lean salt mixture along a predetermined path, past the locality of the aforesaid preliminary heat exchange, to said third region and into admixture there with the enriched salt, for the aforesaid evaporation of normal aluminum halide to produce the aforesaid re-established gaseous flow thereof;

(H) the aforesaid bringing of heated fluid into preliminary heat exchange relation with said re-established halide flow for transferring heat to said re-established halide being effected by conducting the said re-established gas flow through the aforesaid flow of heated lean salt advancing to said third region, in countercurrent relation in said predetermined path.

19. In a system for subhalide refining of aluminum, (A) a converter arranged to be traversed by a stream of normal aluminum halide gas, for conversion of aluminum metal in the converter to gaseous aluminum monohalide, (B) a decomposer for aluminum monohalide comprising (1) means connected to the converter to be traversed by a flow of aluminum-monohalide-containing gas from the converter, and including (2) liquid-conducting means having an inlet and an outlet for liquid, for removing heat from said gaseous monohalide into said liquid as it traverses said liquid conducting means, to decompose the monohalide into aluminum metal and gaseous normal aluminum halide, (3) said decomposer having an outlet for said gaseous normal aluminum halide, (C) means connected to said gas outlet and arranged to hold molten salt, for absorbing normal aluminum halide in said salt, (D) halide-evaporating means arranged to receive molten salt for evaporation of normal aluminum halide contained in such salt, said evaporating means including (1) means connected to the liquid outlet of the decomposer for bringing heated liquid from said liquid outlet into heat transfer relation with said last-mentioned molten salt, to evaporate normal aluminum halide from said last-mentioned molten salt by heat from the decomposition in the decomposer, (2) means connected between the evaporating means and the converter for conducting a flow of the produced gaseous normal aluminum halide to said converter, (E) means including conduits connected between the halide absorbing means and the evaporating means for circulating a flow of aluminum halide-enriched molten salt from the absorbing means to the evaporating means to constitute the aforesaid molten salt therein and a flow of aluminum halide-depleted molten salt from said evaporating means to said absorbing means, and (F) heat exchange means connected to said conduits and providing adjoining, separated paths for said flows of molten salt, to transfer heat from the halide-depleted salt to the halide-enriched salt.

20. A system as defined in claim 19, in which (G) the means connected to the liquid outlet of the decomposer comprises a second heat exchanger arranged to receive the flow of enriched molten salt from the circulating means and the said liquid from the decomposer, in adjoining, separated paths for said liquid and said enriched molten salt, to transfer heat from the said liquid to the salt, and in which (H) the halide evaporating means also comprises a flash tank arranged to receive heated enriched molten salt from said second heat exchanger, for evaporation of normal aluminum halide, (1) said flash tank being connected to deliver the produced gaseous halide to the converter, said system including (2) means connected to the second heat exchanger and receiving said liquid from the aforesaid path thereof, for recirculating said liquid to the liquid inlet of the decomposer, and (I) a third heat exchange means connected between the gas outlet of the decomposer and the absorbing means for traversal by the normal halide gas and having (1) means connected to the molten salt circulating means, for conducting halide-depleted molten salt from a conduit locality downstream of the first-mentioned heat exchange means, through the aforesaid third heat exchange means and back to a conduit locality of said circulating means upstream of the first-mentioned heat exchange means, (2) said third heat exchange means being constructed and arranged to transfer heat from the gas which is traveling to the absorber, to halide-depleted molten salt, so that the halide-depleted molten salt which traverses the first-mentioned heat exchange means is thereby additionally heated.

21. A system as defined in claim 20, which includes reducing valve means connected to be traversed by the halide-enriched molten salt intermediate the second heat exchanger and the flash tank, to maintain pressure of said halide-enriched salt while it is heated by heat exchange prior to entry into the flash tank.

22. A system as defined in claim 20, which includes (J) a fourth heat exchange means having (1) liquid path means connected between the decomposer and the heat exchanger of the evaporating means and having
(2) means providing a gas path connected between the flash tank and the converter to be traversed by halide gas from the flash tank,
for transferring heat from the liquid leaving the decomposer into the halide gas leaving the flash tank.

23. A system as defined in claim 19, in which
(G) the halide evaporating means comprises a flash tank connected to receive halide-enriched molten salt from the circulating means and to deliver halide-depleted molten salt to said circulating means,
(1) the aforesaid means connected to the liquid outlet of the decomposer comprising means introducing liquid from the decomposer into the flash tank in admixture with the halide-enriched molten salt received from the circulating means, to effect evaporation of gaseous normal aluminum halide by heat introduced by said admixture,
(2) said system including means for circulating a portion of halide-depleted molten salt from the flash tank to the liquid inlet of the decomposer, to constitute said halide depleted molten salt as the liquid traversing said decomposer.

24. A system as defined in claim 23, which includes reducing valve means connected to be traversed by the halide-enriched molten salt intermediate the heat exchange means and the flash tank, to maintain pressure of said halide-enriched salt while it is heated by heat transfer from the halide-depleted salt prior to entry into the flash tank.

25. A system as defined in claim 23, which includes
(H) second heat exchange means connected between the gas outlet of the decomposer and the absorbing means for traversal by the normal halide gas from the decomposer,
(1) said means for circulating halide-depleted molten salt from the flash tank to the decomposer including means connected to the molten salt circulating means at a locality of the conduit for the halide-depleted salt downstream of the first-mentioned heat exchange means, to conduct said last-mentioned halide-depleted molten salt through said second heat exchange means and thence to the decomposer,
(2) said second heat exchange means being constructed and arranged to transfer heat from the halide gas traversing it into said last-mentioned halide-depleted molten salt.

26. A system as defined in claim 25, which includes
(I) a second flash tank and in which
(1) the means for circulating halide-depleted molten salt to the decomposer also includes means connected to the first flash tank for conducting another portion of halide-depleted molten salt, from a locality upstream of the first-mentioned heat exchange means, into said second flash tank, to permit evaporation of gas upon pressure drop of liquid reaching said second flash tank,
(2) said second flash tank being connected to deliver molten salt into the decomposer and to deliver gaseous normal halide into the flow of gas between the decomposer and the absorbing means.

References Cited

UNITED STATES PATENTS 3,234,013   2/1966   Phillips et al. _____ 75—68
3,235,376   2/1966   Hollingshead _____ 75—68

HYLAND BIZOT, *Primary Examiner.*

H. W. TARRING, *Assistant Examiner.*

U.S. Cl. X.R.

23—93, 96; 266—9, 13

UNITED STATES PATENT OFFICE
CERTIFICATE OF CORRECTION

Patent No. 3,436,210                                             April 1, 1969

Ernest William Dewing et al.

It is certified that error appears in the above identified patent and that said Letters Patent are hereby corrected as shown below:

Column 2, line 9, "thereon" should read -- there on --. Column 7, line 63, after "metal" insert -- in molten --. Column 10, line 7, "respective" should read -- respectively --. Column 11, line 18, "ineffect" should read -- in effect --; line 43, "reventing" should read -- preventing --. Column 12, line 26, "The" should read -- This --. Column 19, line 26, "and" should read -- or --. Column 20, line 11, "mole" should read -- one mol --. Column 22, line 33, "phere" should read -- pheres --; line 46, "viz" should read -- viz. --. Column 25, line 32, "decirculating" should read -- recirculating --.

Signed and sealed this 30th day of June 1970.

(SEAL)
Attest:

EDWARD M. FLETCHER, JR.
Attesting Officer

WILLIAM E. SCHUYLER, JR
Commissioner of Patents